United States Patent
Chen et al.

(10) Patent No.: US 10,356,773 B2
(45) Date of Patent: Jul. 16, 2019

(54) CONTROL CHANNEL BANDWIDTH DETERMINATION

(71) Applicant: QUALCOMM Incorporated, San Diego, CA (US)

(72) Inventors: Wanshi Chen, San Diego, CA (US); Yang Yang, San Diego, CA (US); Peter Ang, San Diego, CA (US); Chong Li, Weehawken, NJ (US); Hung Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/490,851

(22) Filed: Apr. 18, 2017

(65) Prior Publication Data

US 2018/0063818 A1 Mar. 1, 2018

Related U.S. Application Data

(60) Provisional application No. 62/380,319, filed on Aug. 26, 2016.

(51) Int. Cl.
*H04W 4/00* (2018.01)
*H04W 72/04* (2009.01)
(Continued)

(52) U.S. Cl.
CPC .......... *H04W 72/042* (2013.01); *H04L 5/001* (2013.01); *H04L 5/0053* (2013.01);
(Continued)

(58) Field of Classification Search
CPC ... H04W 72/042; H04W 24/02; H04W 28/20; H04W 74/0833; H04L 5/001; H04L 5/0053; H04L 5/0094
(Continued)

(56) References Cited

U.S. PATENT DOCUMENTS

2010/0227569 A1* 9/2010 Bala ............... H04L 5/0007
455/73
2011/0312328 A1* 12/2011 Choi ............... H04L 5/0062
455/450
(Continued)

FOREIGN PATENT DOCUMENTS

EP 3002983 A1 4/2016

OTHER PUBLICATIONS

Partial International Search Report—PCT/US2017/046517—ISA/EPO—dated Oct. 30, 2017.
(Continued)

*Primary Examiner* — Sai Ming Chan
(74) *Attorney, Agent, or Firm* — Loza & Loza, LLP

(57) ABSTRACT

Aspects of the disclosure relate to determination of bandwidth, frequencies, or a set one or more of subbands that carries a downlink control channel. In some examples, a set of one or more subbands that carries a downlink control channel may be determined based on a function of a predetermined reference resource location. The predetermined reference resource location may be a set of one or more subbands that carries one or more synchronization signals and a broadcast channel. Other aspects, embodiments, and features are also claimed and described.

30 Claims, 15 Drawing Sheets

(51) Int. Cl.
H04W 24/02 (2009.01)
H04W 28/20 (2009.01)
H04W 74/08 (2009.01)
H04L 5/00 (2006.01)

(52) U.S. Cl.
CPC ........... *H04L 5/0094* (2013.01); *H04W 24/02* (2013.01); *H04W 28/20* (2013.01); *H04W 74/0833* (2013.01)

(58) Field of Classification Search
USPC ........................................................ 370/329
See application file for complete search history.

(56) References Cited

U.S. PATENT DOCUMENTS

2012/0093115 A1* 4/2012 Guan .................... H04L 5/0007 370/329
2014/0010139 A1* 1/2014 Choi ....................... H04W 4/06 370/312
2016/0150561 A1 5/2016 Dinan et al.
2016/0183154 A1* 6/2016 Van Der Velde ........................... H04W 36/0083 370/331

OTHER PUBLICATIONS

ZTE: "Considerations on Channel Raster for NB-IoT", 3GPP Draft; R1-160051 Channel Raster, 3rd Generation Partnership Project (3GPP), Mobile Competence Centre ; 650, Route Des Lucioles ; F-06921 Sophia-Antipolis Cedex; France, vol. RAN WG1, no. Budapest, HU, Jan. 18, 2016-Jan. 20, 2016, Jan. 11, 2016 (Jan. 11, 2016), XP051064635, pp. 1-7, Retrieved from the Internet: URL: http://www.3gpp.org/ftp/tsg_ran/WG1_RL1/TSGR1_AH/LTE NB-IoT_1601/Docs/.
International Search Report and Written Opinion—PCT/US2017/046517—ISA/EPO—dated Jun. 7, 2018.

* cited by examiner

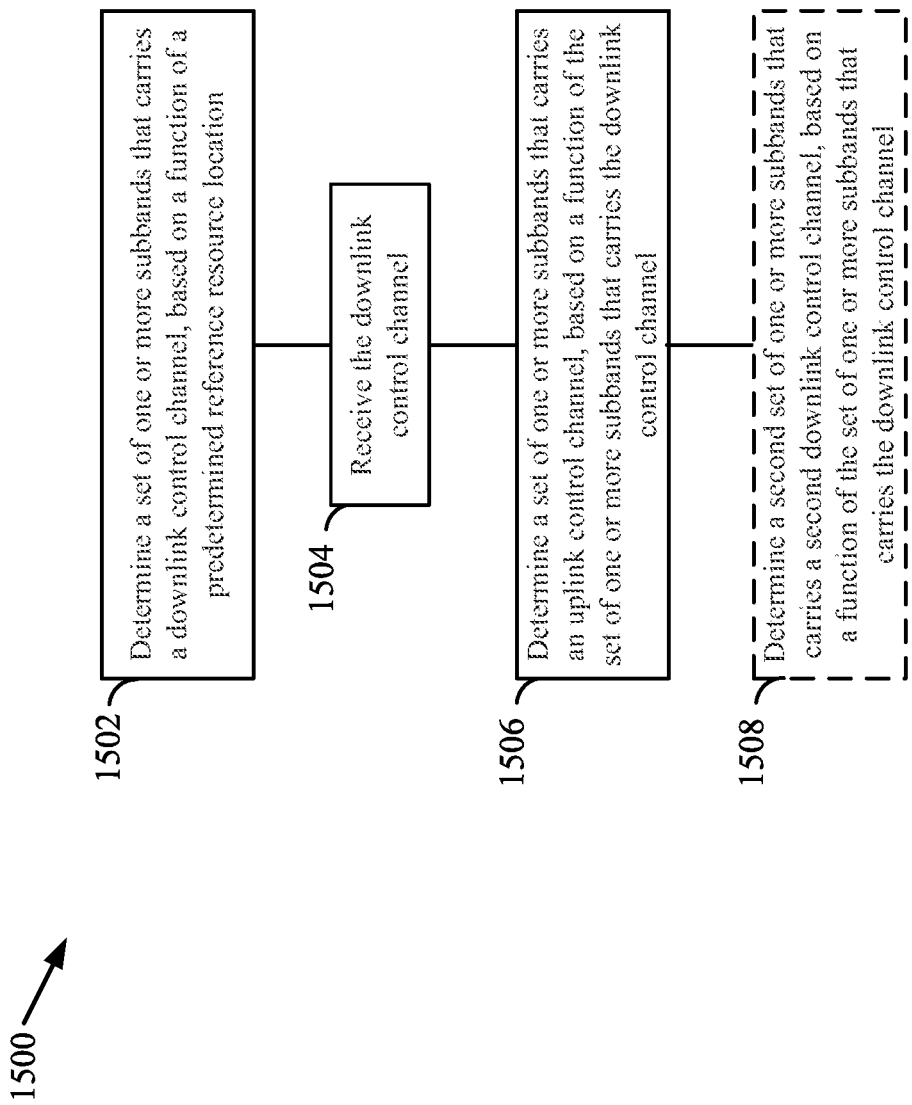

CONTROL CHANNEL BANDWIDTH DETERMINATION

PRIORITY CLAIM

This application claims priority to and the benefit of provisional patent application No. 62/380,319 filed in the United States Patent and Trademark Office on Aug. 26, 2016, the entire content of which is incorporated herein by reference as if fully set forth below in its entirety and for all applicable purposes.

TECHNICAL FIELD

The technology discussed below relates generally to wireless communication systems, and more particularly, to determination of bandwidth, frequencies, subcarriers, or subbands allocated for control channels.

INTRODUCTION

When a wireless communication device acquires a connection with a telecommunication network, it is generally required for the device to make certain determinations about the nature of the network so that the device can function in that network. Over time, a particular wireless communication device might acquire such connections on a variety of different networks having a broad range of configurations, so these determinations may be made regularly. Thus, there is a desire for these processes to be as efficient as practicable.

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE, which generally corresponds to a fifth generation (5G) network as that term is defined by the next generation mobile networks (NGMN) alliance. As it stands today, this 5G network may exhibit a higher degree of flexibility and scalability than LTE, and is envisioned to support very diverse sets of requirements. Therefore, an efficient and flexible manner for a device to determine various aspects of the network upon acquisition is desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example a method for determining the bandwidth, frequencies, or a set of one or more subbands that carry one or more downlink control channels is disclosed. The method includes determining a set of one or more subbands that carries a downlink control channel, based on a function of a reference resource, or a predetermined reference resource location within an air interface. The predetermined reference resource location may be a set of one or more subbands that carries one or more synchronization signals such as a primary synchronization signal (PSS) and a secondary synchronization signal (SSS) and a broadcast channel such as a physical broadcast channel (PBCH).

In another aspect, an apparatus for wireless communication is provided. The apparatus includes a processor, a transceiver communicatively coupled to the processor, and a memory communicatively coupled to the processor. The processor is configured to determine a set of one or more subbands that carries a downlink control channel, based on a function of a predetermined reference resource location.

In still another aspect, a non-transitory computer-readable medium storing computer-executable code is provided. The non-transitory computer-readable medium storing computer-executable code includes code for causing a computer to determine a set of one or more subbands that carries a downlink control channel, based on a function of a predetermined reference resource location.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 15 is a another flow diagram of a method of wireless communication between a scheduling entity and a scheduled entity over an air interface comprising a plurality of subbands according to some aspects of the present disclosure.

DETAILED DESCRIPTION

Figure 1:
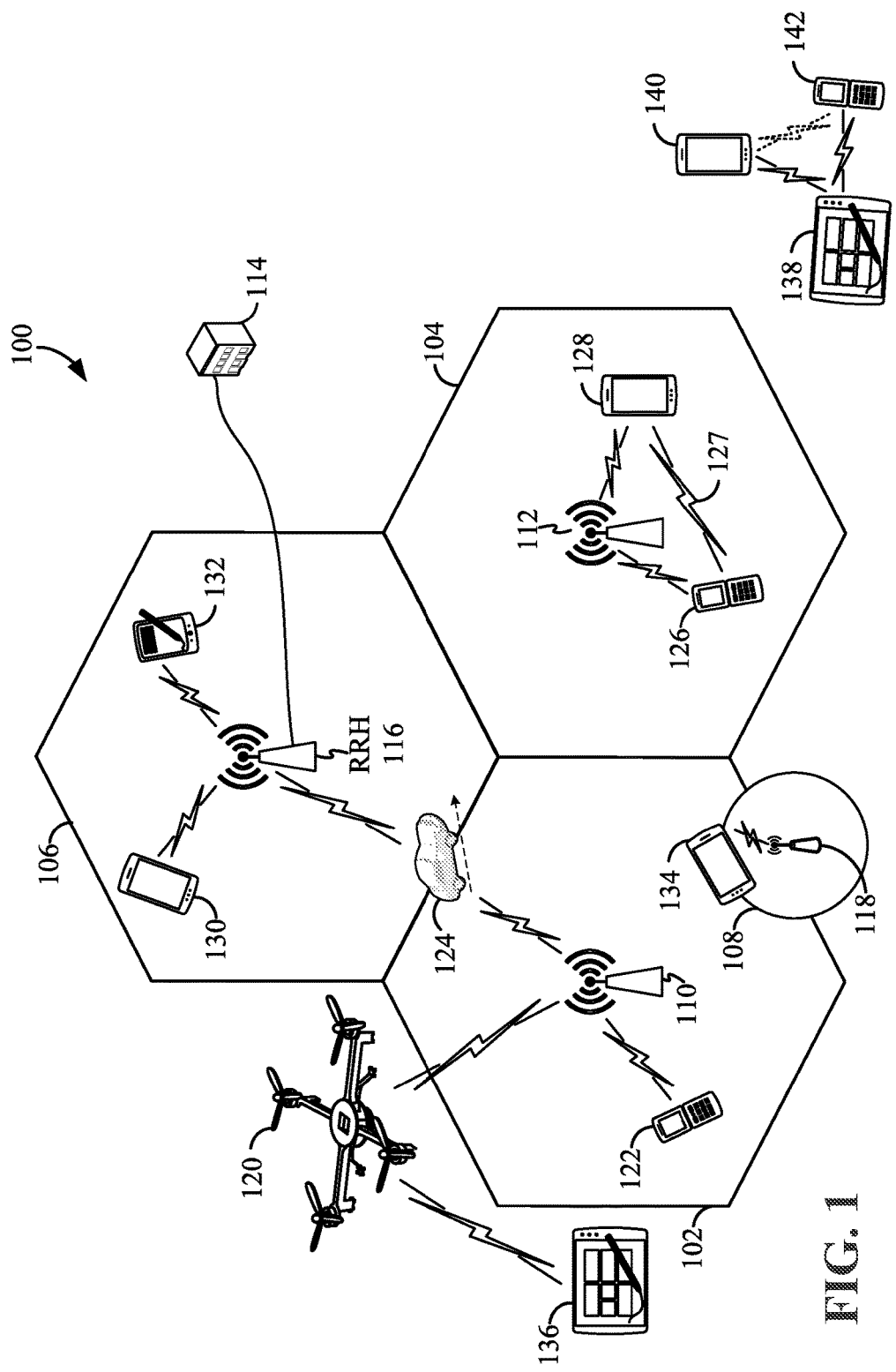
FIG. 1 is a conceptual diagram illustrating an example of an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Definitions

NR: new radio. Generally refers to 5G technologies and the new radio access technology undergoing definition and standardization by 3GPP in Release 15.

eMBB: enhanced mobile broadband. Generally, eMBB refers to the continued progression of improvements to existing broadband wireless communication technologies such as LTE. eMBB provides for (generally continuous) increases in data rates and increased network capacity.

URLLC: ultra-reliable and low-latency communication. Sometimes equivalently called mission-critical communication. Reliability refers to the probability of success of transmitting a given number of bytes within 1 ms under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms (in some examples, a target for eMBB may be 4 ms).

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

Subband: As used in the present disclosure, subbands are discrete frequency units corresponding to an orthogonal frequency division multiplexing (OFDM) air interface. A control subband (or subband as referred to herein) may be referred to as "control resource set". As used herein, the terms subband and control resource set are used interchangeably. Because the system bandwidth can be large (>100 MHz is possible) a UE may not be able to (or it is not energy efficient to) monitor the entire system bandwidth for its control messages. Therefore, the control information may be located within one or more control subbands, each taking 5-20 MHz.

Subcarrier: As used in the present disclosure, a subcarrier refers to a single frequency tone, normally on the order of 15 kHz to 240 kHz, which dictates OFDM symbol length. 1 subcarrier in 1 symbol=1 resource element (RE).

Resource block: As used in the present disclosure, a resource block, in both LTE and NR, refer to 12 REs in frequency, and it is the minimum allocation unit for the physical downlink shared channel (PDSCH).

Band: As used in the present disclosure, band normally refers to the entire system bandwidth, e.g., it can be 20 MHz, 80 MHz, or 100 MHz, Band can be divided into several subbands, each roughly on the order of 5-20 MHz. The concept of subband come into existence because in NR, the system bandwidth could be very large (>100 MHz is possible), whereas each UE may only be able to open 5-20 MHz RF (Radio Frequency), and thus the system may need to divide its entire bandwidth into subbands, and may need to assign UE to different subbands, depending on the UE's RF capability.

Radio Access Network

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
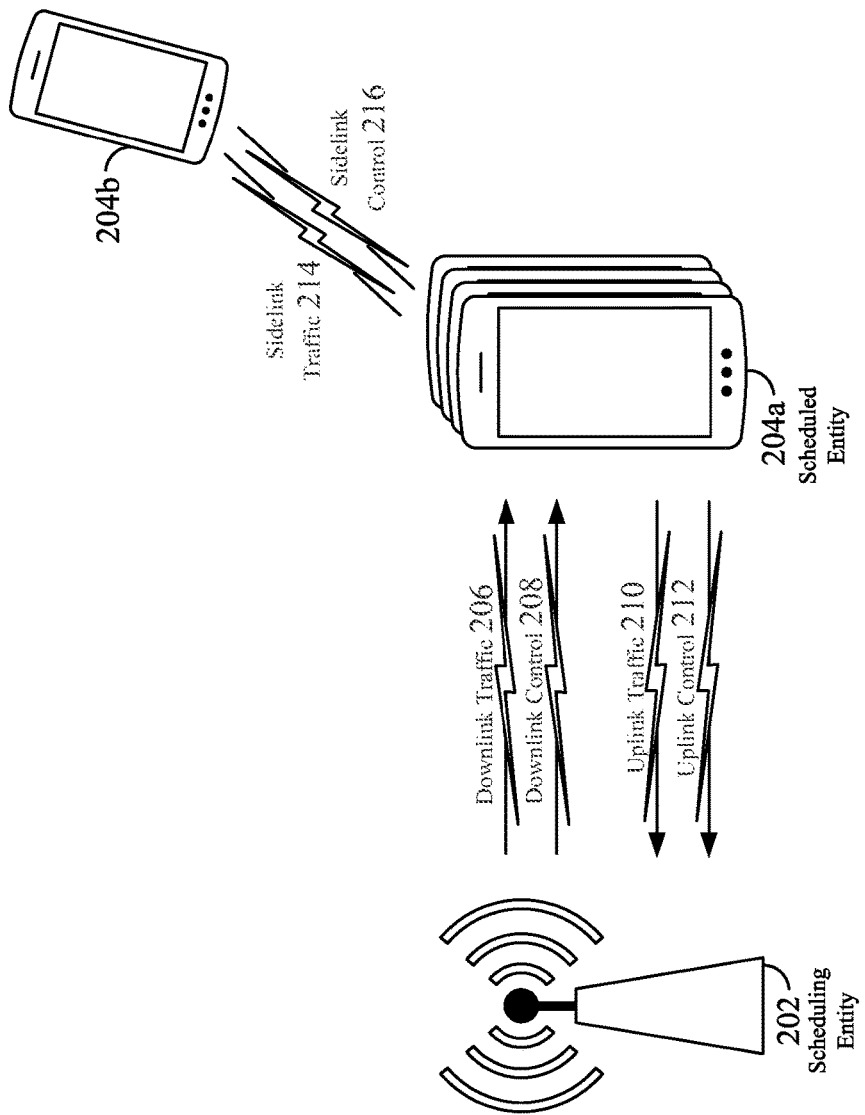
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions. In additional examples, the uplink control information on the control channel 212 may include feedback information (e.g., HARQ feedback) corresponding to received downlink data.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Scheduling Entity

Figure 3:
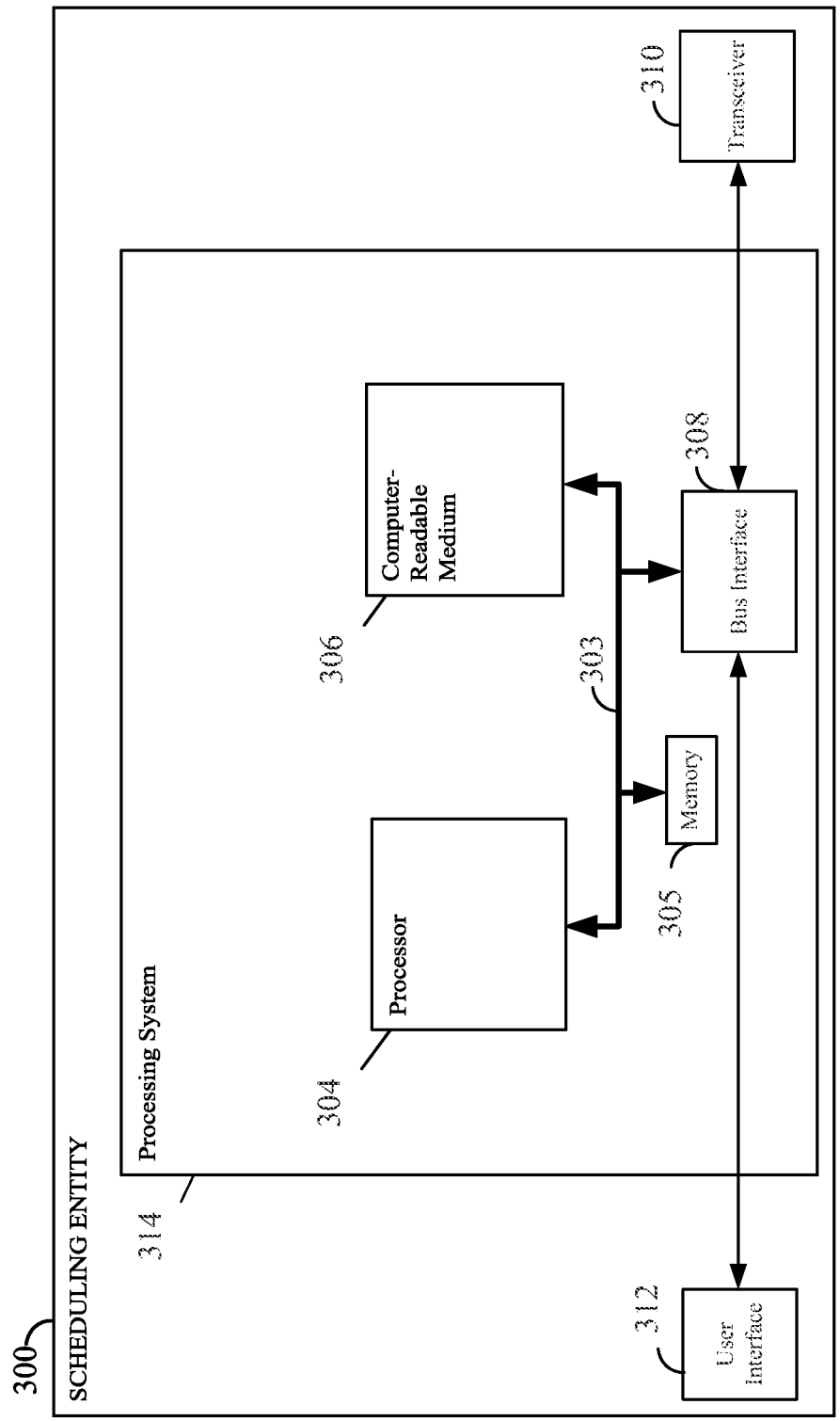
FIG. 3 is a block diagram illustrating an example of a hardware implementation for a scheduling entity employing a processing system.

FIG. 3 is a block diagram illustrating an example of a hardware implementation for a scheduling entity 300 employing a processing system 314. For example, the scheduling entity 300 may be a user equipment (UE) as illustrated in FIG. 1. In another example, the scheduling entity 300 may be a base station as illustrated in FIG. 1.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIGS. 9-15.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, computer-executable code, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Scheduled Entity

Figure 4:
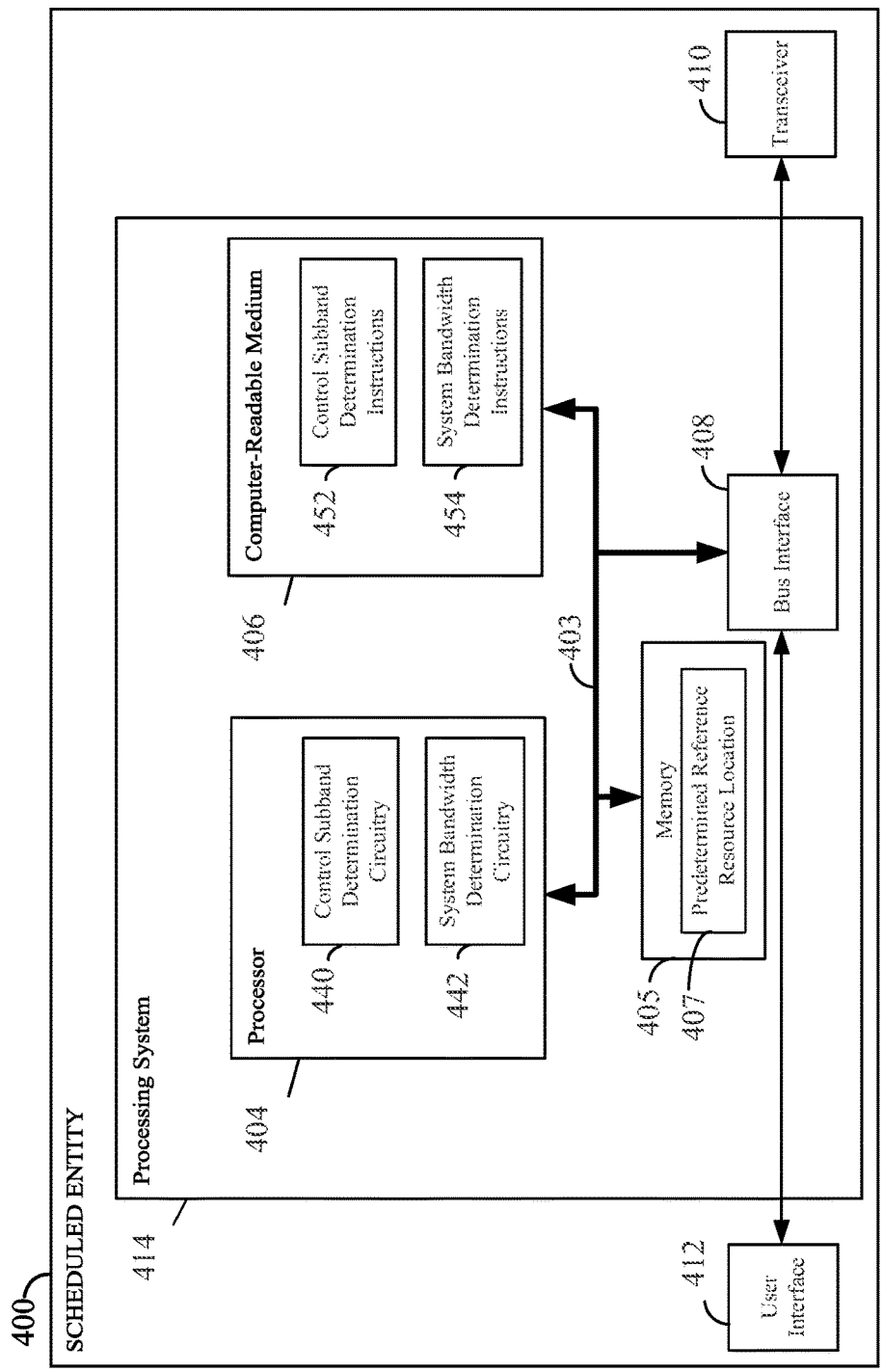
FIG. 4 is a block diagram illustrating an example of a hardware implementation for a scheduled entity employing a processing system.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in FIG. 1, and/or the scheduled entity 202 as illustrated in FIG. 2.

The processing system 414 may be substantially the same as the processing system 314 illustrated in FIG. 3, including a bus interface 408, a bus 402, memory 405, a processor 404, and a computer-readable storage medium 406 (i.e., a computer-readable medium, a non-transitory computer-readable medium). Furthermore, the memory 405 may include a space to store a predetermined reference resource location 407, as that term will be described herein below. Furthermore, the scheduled entity 400 may include a user interface 412 and a transceiver 410 substantially similar to those described above in FIG. 3. That is, the processor 404, as utilized in a scheduled entity 400, may be used to implement any one or more of the processes described below and illustrated in FIGS. 9-15.

In some aspects of the disclosure, the processor 404 may include control subband determination circuitry 440 configured for various functions, including, for example, determining a set of one or more subbands that carries a downlink control channel, based on a function of a predetermined reference resource location. The processor 404 may further include system bandwidth determination circuitry 442 configured for various functions, including, for example, determining a system bandwidth for UL and/or DL data.

In one or more examples, the computer-readable storage medium 406 may include control subband determination instructions 452 configured for various functions, including, for example, determining a set of one or more subbands that carries a downlink control channel, based on a function of a predetermined reference resource location. For example, the control subband determination instructions 452 may be configured to implement one or more of the functions described herein in relation to FIGS. 9-15, including, e.g., blocks 1302-1310 of FIG. 13. The computer-readable storage medium 406 may further include system bandwidth determination instructions 454 configured for various functions, including, for example, determining a system bandwidth for UL and/or DL data. For example, the system bandwidth determination instructions 454 may be configured to implement one or more of the functions described herein in relation to FIG. 9-15, including, e.g., blocks 1402-1408 of FIG. 14.

Slot Structure

A carrier configured according to an aspect of the present disclosure may support any of multiple slot structures. For example, FIG. 5 is a schematic illustration of two exemplary slots that may be carried on a TDD carrier according to some aspects of the disclosure, including a downlink (DL)-centric slot 502 and an uplink (UL)-centric slot 504.

In the DL-centric slot 502, a majority (or, in some examples, a substantial portion) of the slot includes DL data. The illustrated example shows a DL control region 506 followed by a DL data region 508. The DL control region 506 may carry DL control information on one or more DL control channels. The DL data region 508 may sometimes be referred to as the payload of the DL-centric slot 502. The DL data region 508 may carry DL data information on one or more DL data channels (e.g., a shared channel).

Figure 5:
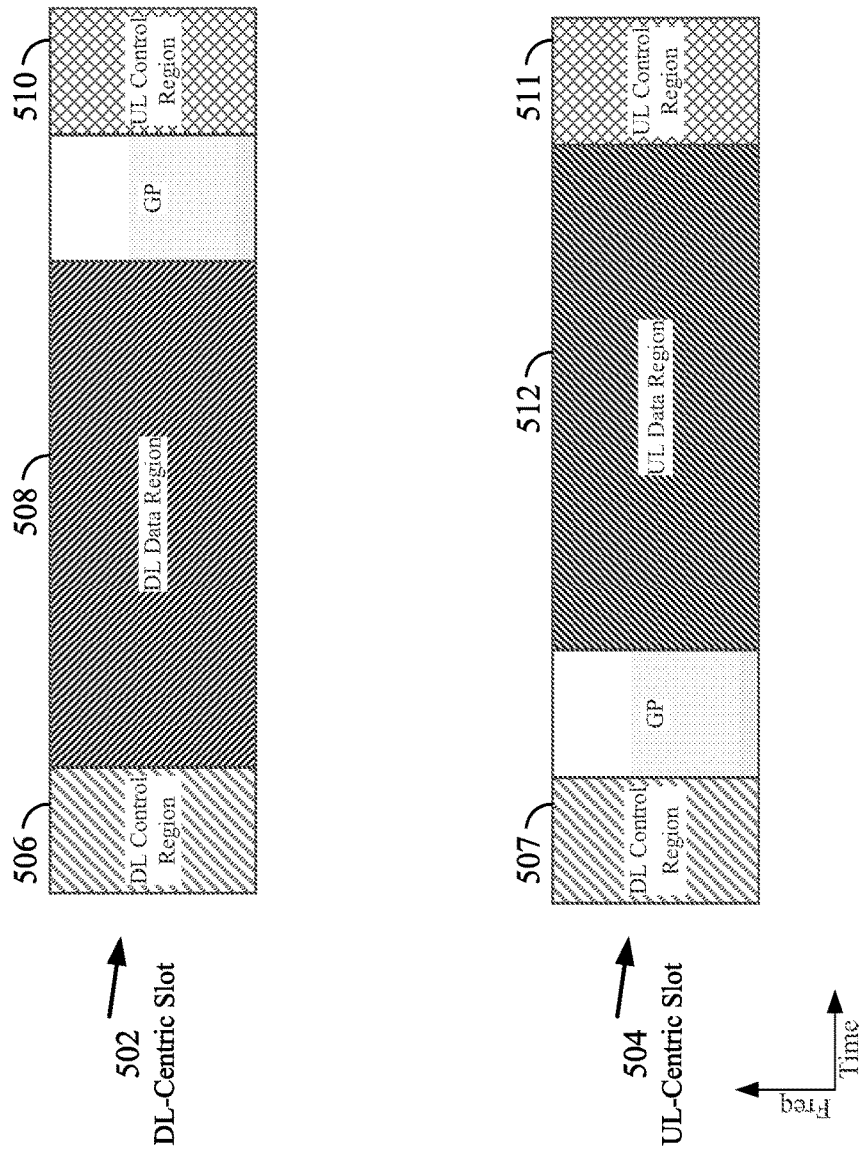
FIG. 5 is a schematic illustration of two exemplary slots that may be carried on a time division duplex (TDD) carrier according to some aspects of the disclosure.

As illustrated in FIG. 5, the end of the DL data region 508 may be separated in time from the beginning of the UL control region 510. This time separation may sometimes be referred to as a gap, a guard period, a guard interval, and/or various other suitable terms. The gap is identified in FIG. 5 by a region identified with the letters "GP" standing for guard period. This separation provides time for the switchover from DL communication (e.g., reception by the scheduled entity (e.g., UE)) to UL communication (e.g., transmission by the scheduled entity (e.g., UE)). After a suitable guard period, the illustrated example includes an UL control region 510. The UL control region 510 may sometimes be referred to as an UL burst, a common UL burst, and/or various other suitable terms. The UL control region 510 may carry UL control information on one or more UL control channels.

However, this is merely one exemplary configuration for a DL-centric slot 502. Other configurations may be limited only to DL control region 506 and DL data region 508; and may include any suitable number of switching points (e.g., DL to UL or UL to DL switching). That is, it is not necessary that a particular control region or data region be a single region within a slot, or that the regions exhibit the sequence provided in the illustration. Any number of the respective regions may appear in any suitable sequence. Moreover, the duration or number of symbols in each of the respective regions, or the guard period, are not limited to the configuration illustrated in FIG. 5, but rather, each control and data interval may take any suitable portion of the slot, and in some examples, one or more of the regions may be omitted from a particular slot. Further, the size of each of the respective regions may vary over time, although the total number of configurations and how often the configuration is changed may be desired to be limited to reduce the potential overhead impact of signaling for those changes.

In an UL-centric slot 504, a majority (or, in some examples, a substantial portion) of the slot includes UL data. The illustrated example shows a DL control region 507 followed by a guard period. The DL control region 507 may carry DL control information on one or more DL control channels. As described above, the guard period may provide for the switchover from DL communication to UL communication.

After a suitable guard period, the illustrated example includes an UL data region 512. The UL data region 512 may sometimes be referred to as the payload of the UL-centric slot 504. The UL data region 512 may carry UL data information on one or more UL data channels (e.g., a shared channel). After the UL data region 512, the illustrated example includes an UL control region 511, UL burst, common UL burst, etc. as described above.

However, this is merely one exemplary configuration for a UL-centric slot 504. Other configurations may be limited only to a DL control region and an UL data region 512; and may include any suitable number of switching points (e.g., DL to UL or UL to DL switching). That is, it is not necessary that a particular control region or data region be a single region within a slot, or that the regions exhibit the sequence provided in the illustration. Any number of the respective regions may appear in any suitable sequence. Moreover, the duration or number of symbols in each of the respective regions, or the guard period, are not limited to the configuration illustrated in FIG. 5, but rather, each control and data interval may take any suitable portion of the slot, and in some examples, one or more of the regions may be omitted from a particular slot. Further, the size of each of the respective regions may vary over time, although the total number of configurations and how often the configuration is changed may be desired to be limited to reduce the potential overhead impact of signaling for those changes.

In the illustrated examples, it is noted that both the DL-centric slot 502 and the UL-centric slot 504 include a DL control region 506 at the beginning of the slot, and an UL control region 510 at the end of the slot. While this configuration with common UL and DL control regions in all slots is not necessary to be used in any particular implementation, this implementation can provide for low latency. That is, such a slot structure can guarantee that every slot may include an opportunity for packets in both the UL and DL direction, such that a device generally need not have an extended period of latency waiting for an opportunity to transmit or receive high-priority packets.

Limited Control Resource Grid

In the above exemplary slots, the respective control and data regions are only separated from one another in the time domain, and each region occupies the entire bandwidth of the slot. However, in any given slot this is not necessarily the case, and the control regions and data regions may be multiplexed in the frequency domain as well.

For example, according to an aspect of the disclosure, the bandwidth for a control channel or a control region including a set of control channels may be limited, and may span less than the entire system bandwidth for a carrier. Additionally, as with the above-described examples in FIG. 5 (although not necessarily always to be the case), a control region may occupy a limited set of symbols, i.e., less than all time-domain subdivisions of the carrier. As it will be described in further detail below, placing suitable limitations such as these on the control regions can enable more efficient monitoring of the control channels, as well as providing forward compatibility for devices as the standards and capabilities of wireless communication technology continue to evolve.

Figure 6:
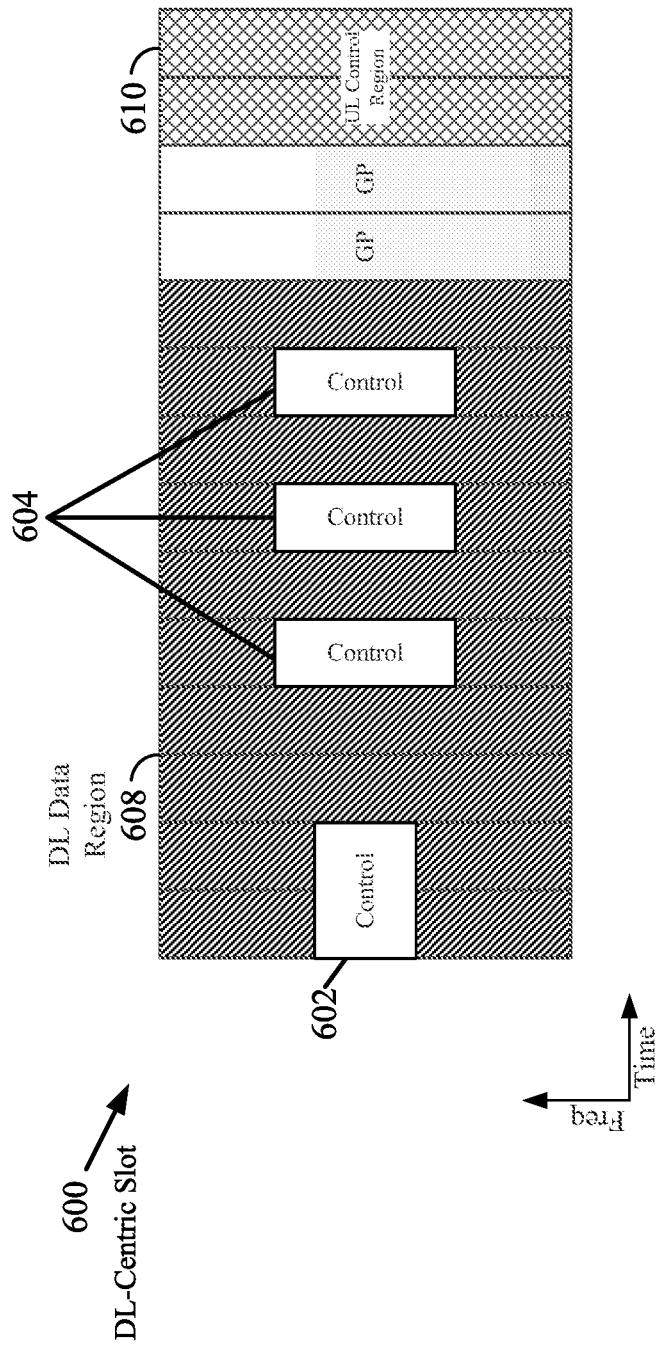
FIG. 6 is a schematic illustration of a 0.5 ms slot structure according to some aspects of the present disclosure.

FIG. 6 is a schematic illustration of a 0.5 ms slot 600 structure according to some aspects of the present disclosure. The slot may be a DL-centric slot for purposes of illustration. The slot may have a control region 602, a DL data region 608, a region designated as a guard period (GP), and an UL control region 610, which is separated from the DL data region 608 by the GP. As illustrated, in a slot structured according to some aspects of the disclosure, the frequency bandwidth for a control region 602 may be limited, or less than a full system bandwidth, regardless of the actual system bandwidth. For example, while FIG. 6 is not drawn to scale, it may be seen that a 10 MHz bandwidth may be used for a control region, within an 80 MHz system bandwidth. In another example, a 5 MHz bandwidth may be used for a control region, within a 20 MHz system bandwidth.

In some examples, one or more control channels may occupy only the first symbol of a slot. One example where this limitation would be suitable for a control channel would be a channel that provides slot structure indication corresponding to the subsequent symbols of the slot.

In some examples, one or more control channels may occupy multiple symbols, such as the control region 602 in FIG. 6 that spans the first two symbols of the illustrated slot 600.

In still other examples, one or more control channels 604 may be present within the data region 608 of the slot. That is, within the present disclosure, the terms "control region" and "data region" do not necessarily imply that the respective regions carry exclusively control or data channels. Rather, in some examples, a control region may carry one or more data symbols or data channels, and a data region may carry one or more control symbols or control channels. In general, a control region primarily carries control channels, and a data region primarily carries data channels.

Accordingly, with reference once again to FIG. 6, control channels 604 are illustrated within the data region 608 of the slot 600, wherein the control channels within the data region 608 in the illustrated example span less than the entire system bandwidth. As illustrated, it is not necessary for the control region to have the same bandwidth as the control channels carried in the data region, and any suitable bandwidth may be utilized in a particular implementation.

One example where it may be appropriate for a data region to include control channels such as these may be to schedule data transmissions, especially for ultra-reliable low latency communications (URLLC). That is, while the control region 602 at the beginning of the slot may carry scheduling information for the data transmissions in the data region 608, it may arise that an URLLC packet needs to be transmitted immediately, without needing to wait until it might be scheduled in the control region at the beginning of the following slot. Accordingly, a control channel 604 within the data region 608 may carry a grant modification or a reassignment of resources within the data region 608 for carrying the URLLC packet.

Forward Compatibility/URLLC Considerations

Placing such limits (e.g., bandwidth constraints) on the resources occupied by control channels can provide for operation in a very wide bandwidth access network, even by legacy devices or inexpensive devices incapable of operating with that full bandwidth. That is, these devices may be enabled to seek control information within a relatively narrower bandwidth, to obtain suitable control information to enable communication on a portion of the full system bandwidth.

However, another concern for a slot structure is that it not only provide such support for legacy devices, but that it can be potentially be used by future devices not yet designed or even contemplated, which might later operate according to future standards. In this regard, according to another aspect of the present disclosure, a slot structure may additionally support different numerologies or combinations of numerologies, and/or the potential need for resource reservation for high priority services (e.g., utilizing URLLC packets). For example, while the present disclosure generally describes a slot duration of 0.5 ms, a future slot or URLLC duration may be shorter, e.g., 0.25 ms.

To this end, the structure of a slot may be designed or configured to include one or more reserved or unspecified regions. A reserved or unspecified region may be a region within a slot that includes one or more resource elements (REs) unoccupied by control or data information, such that a full-function wireless communication system may operate with devices ignoring any signal that might correspond to those reserved or unoccupied regions. In this way, future enhancements or changes may be implemented and assigned to these reserved regions without necessarily affecting the communication by devices previously configured to ignore those regions. In some examples, these reserved regions may be two-dimensional, having time and frequency dimensions. That is, a reserved region may have a duration of any suitable number of one or more symbols, and a bandwidth of any suitable number of one or more subbands.

In some examples, such a gap or guard period may be located between a DL grant and its corresponding DL data. In some examples, a gap, a reserved region, or an unoccupied region may be considered an unspecified frequency region or guard band within a symbol or a set of symbols.

In some examples, multiple guard periods within a slot may be provided, to enable multiple turnarounds/switches in the direction of transmission.

Figure 7:
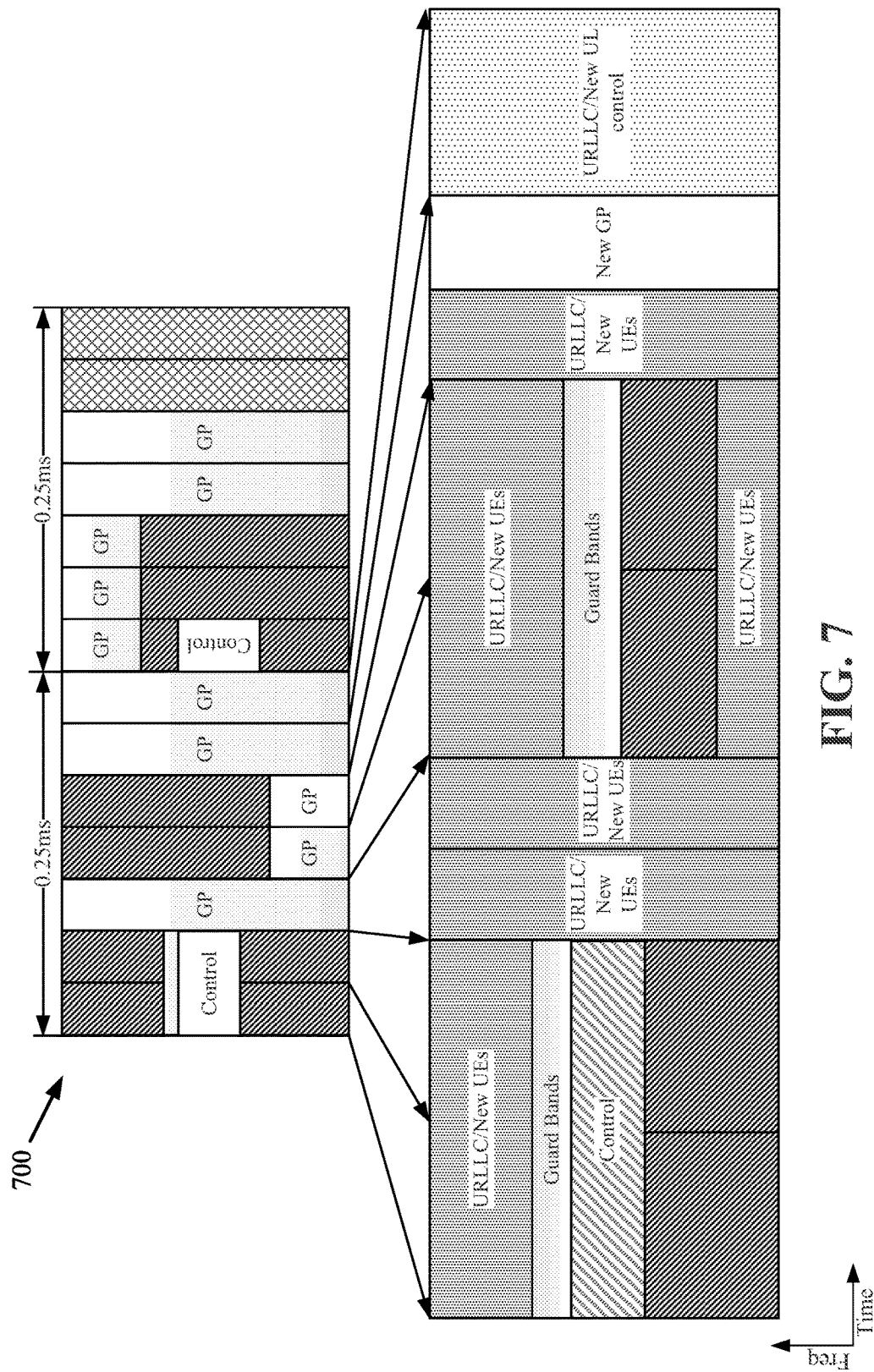
FIG. 7 is a schematic illustration of an exemplary 0.5 ms slot configured according to some aspects of the present disclosure, including support for different numerologies and reserved regions.

FIG. 7 is a schematic illustration of an exemplary 0.5 ms slot 700 configured according to some aspects of the present disclosure, including support for different numerologies and reserved regions. As illustrated in the slot 700, the configurations of the various control and data regions are such that the 0.5 ms slot may also operate as two 0.25 ms slots. In addition, various portions of the slot 700 are illustrated as guard periods (GP). In this illustration, some guard periods occupy the entire system bandwidth, while other guard periods only occupy a portion of the full system bandwidth, providing for usable resource elements (REs) within the same symbol as other, reserved REs.

Furthermore, in this illustration the first 0.25 ms "slot" (referred to below as a half-slot) is expanded to illustrate potential future occupancy of the various resources within that half-slot. As illustrated, certain regions that were guard periods or guard bands in the initial slot may be filled with URLLC packets and/or data or control packets utilized by new UEs, or devices configured according to a later standard or configuration. Moreover, as illustrated, the URLLC packets and/or the packets for the new UEs may utilize a different numerology than the packets of the initial slot, such as having a shorter symbol duration. That is, two URLLC symbols may be carried within the duration of a single symbol in the initial slot.

Bandwidth Indication in LTE

The above discussion has been relatively general and without specific reference to any particular communication standard. In order to further illustrate the novelty and inventiveness of the concepts presented within the present disclosure, a discussion of certain related concepts known in the art and implemented within LTE standards are described below.

With reference to an LTE network, wireless communication may utilize frequency division duplexing (FDD) or time division duplexing (TDD). The below discussion of certain aspects of LTE communication applies to both FDD and TDD deployments.

Figure 8:
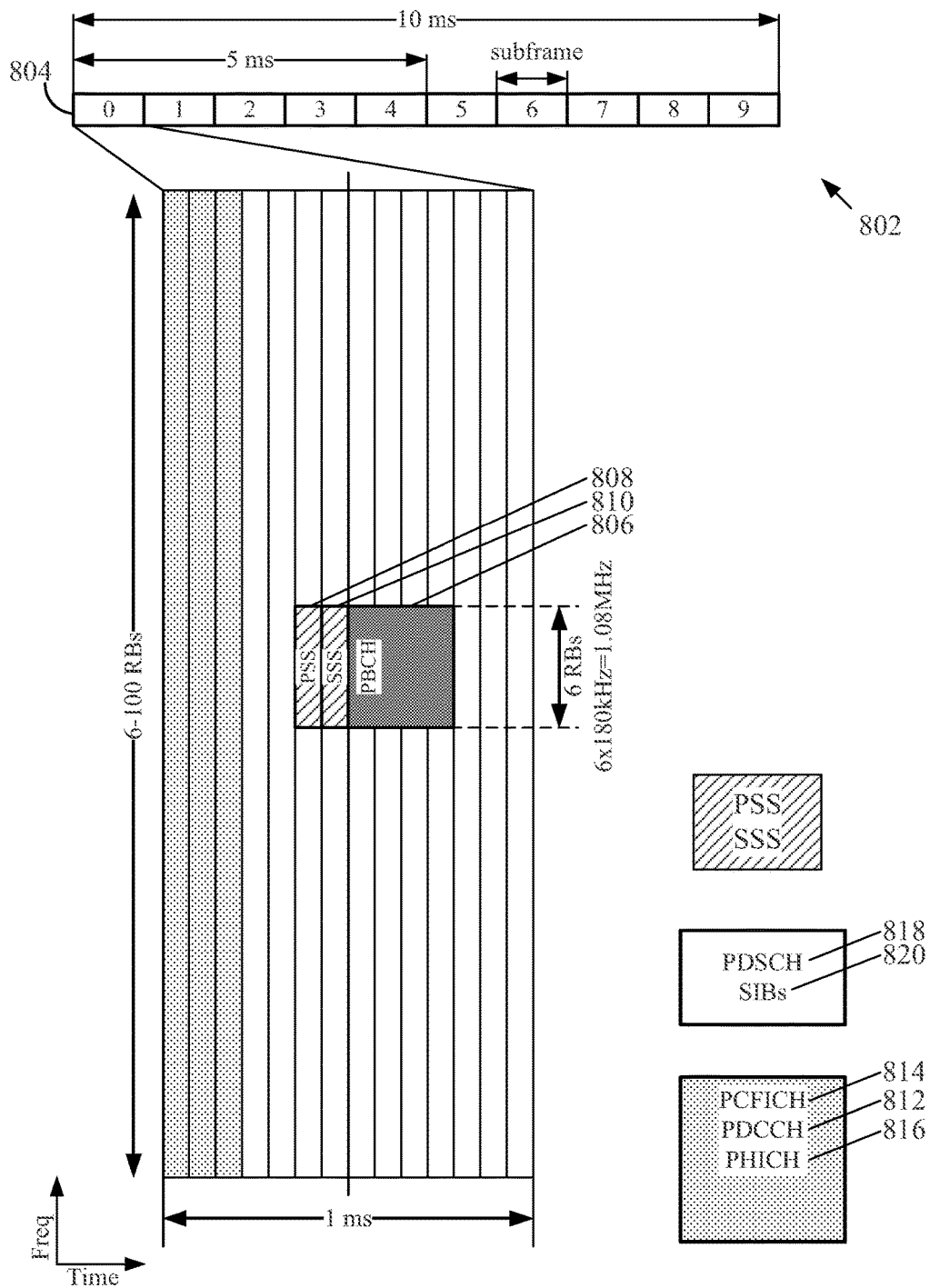
FIG. 8 is a schematic illustration of a subframe in an LTE network, showing some of the channels that may be carried in subframe 0 of a particular frame according to some aspects of the present disclosure.

Certain LTE DL channels are illustrated in FIG. 8. In this illustration, at the top, a 10 ms radio frame 802 is shown subdivided into ten 1 ms subframes. Each subframe is further subdivided into two 0.5 ms slots (not illustrated). Subframe 0 804 is expanded to show additional detail in the time and frequency dimensions. That is, for the purpose of explanation, FIG. 8 illustrates some of the channels that may be carried in subframe 0 804 of a particular radio frame 802 according to some aspects of the present disclosure. It is to be understood that these are not all of the channels that might be carried in a given subframe, and it is not necessary that all of the described channels below would always appear in such a subframe.

In the horizontal direction, representing the time dimension, the subframe is subdivided into a number of OFDM symbols: the exact number of OFDM symbols per subframe can vary to some extent based on the configuration of the symbols. The vertical direction represents the frequency dimension. In LTE, the frequency dimension is subdivided into orthogonal subcarriers, such that the intersection of one subcarrier and one OFDM symbol provides one resource element (RE). REs are grouped into resource blocks (RBs), where each RB includes 12 subcarriers (180 KHz) and 1 slot.

The system bandwidth can range from 6 RBs to 100 RBs. This illustration shows the entire system bandwidth for an exemplary carrier, where the given carrier has a system bandwidth greater than 6 RBs.

The illustrated subframe 0 804 includes a physical broadcast channel (PBCH) 806. The PBCH 806 carries a master information block (MIB) that repeats every 4 frames and includes information relating to the overall DL transmission bandwidth, PHICH configuration, and a system frame number (SFN). In LTE networks according to today's standards, the system bandwidth can be 6, 15, 25, 50, 75, or 100 RBs.

The illustrated subframe 0 804 further includes a primary synchronization signal (PSS) 808 carried on the primary synchronization channel (P-SCH) and secondary synchronization signal (SSS) 810 carried on the secondary synchronization channel (S-SCH). The PSS 808 and SSS 810 provide for frequency and timing acquisition, including the determination of the carrier frequency and OFDM symbol, subframe, and frame timing. The PSS 808 and SSS 810 always appear in subframe 0 and 5 of a frame, while the PBCH 806 always appears in subframe 0 of a frame. Each of the PSS 808, SSS 810, and PBCH 806 appears in the middle six (6) RBs (or 1.08 MHz) of the channel bandwidth.

The illustrated subframe further includes a physical downlink control channel (PDCCH) 812. The PDCCH 812 carries UL/DL resource assignments or grants, transmit power control (TPC) commands, and paging indicators. The PDCCH 812 typically occupies 1 to 4 OFDM symbols per subframe, with the number being carried on the physical control format indicator channel (PCFICH) 814.

The illustrated subframe further includes a physical control format indicator channel (PCFICH) 814. The PCFICH 814 carries a control format indicator (CFI), which indicates the number of OFDM symbols to be used for the transmission of the PDCCH. The PCFICH 814 is carried in the first OFDM symbol of a subframe.

The illustrated subframe further includes a physical HARQ indicator channel (PHICH) 816. The PHICH 816 is used to transmit ACK/NACK feedback responsive to UL transmissions from the UE on the physical downlink shared channel (PDSCH) 818. The PHICH 816 may be carried on the first OFDM symbol, or in some examples, over 2 or 3 OFDM symbols.

Unlike the PSS 808, SSS 810, and PBCH 806, which are limited to a 6-RB bandwidth at the center of the system bandwidth, the PCFICH 814, PHICH 816, and PDCCH 812 are designed based on the entire system bandwidth in LTE.

The illustrated subframe further includes a physical downlink shared channel (PDSCH) 818. The PDSCH 818 carries data information, having resources that may be shared among a plurality of users. Although not illustrated, the PDSCH 818 may further include one or more system information blocks (SIB s) 820. The SIBs 820 carry various system information. SIB type 1 (SIB1) is repeated every eight frames, and includes a variety of information, such as scheduling information for other forthcoming SIBs, as well as the UL system bandwidth. In LTE, the UL system bandwidth can be different from the DL system bandwidth. In general, the SIBs (SIB1, SIB2, etc.) can be scheduled anywhere in the DL system bandwidth within the PDSCH 818.

Determining the Set of Subcarriers that Carries Control Channels

3GPP has recently begun a process for standardization of a next-generation wireless communication network as a successor to LTE. In the present disclosure, this successor technology may equivalently be referred to as a fifth-generation (5G), or a new radio (NR) network. However, the invention described in the present disclosure is not intended only to apply to NR networks. While specific examples are provided herein below in a manner corresponding to the ongoing development of the NR technology, it is to be understood that these examples are provided only to aid in the explanation of the general concepts and aspects of the invention.

Unlike the restrictions placed on the location of the PSS, SSS, and PBCH in an LTE network as described above, in an NR network, channels such as these may not necessarily be located in the center of the system bandwidth, and may occupy a wide bandwidth (e.g., as wide as 5 MHz, or any other suitable bandwidth). In fact, the specific bandwidth that carries the PSS/SSS/PBCH may in some examples be cell-specific (i.e., generally different from one cell to another) or zone-specific (each zone is defined as a set of cells). In addition, in an NR network, unlike an LTE network, control channels such as the PCFICH and PDCCH are expected to be narrowband channels that occupy less than the entire system bandwidth.

In LTE, the PBCH indicates the system bandwidth. Because the control bandwidth in LTE is the same as the system bandwidth, the configuration for the control channel can be known to the UE immediately upon decoding the PBCH. Then the UE can monitor the control channel for further system information in SIB transmissions. In contrast, in NR, the control channel could exist in the form of multiple subbands, and as a result, in order for the UE to access the SIB message from one of the control subbands, it derives that control subband location/configuration/bandwidth after PSS/SSS/PBCH decoding.

Note that there might be more than one control subband, and each control subband can either be common or UE-specific. The common subband may be monitored by all UEs (or at least a group of UEs) to get some broadcast information such as paging/SIB information, which is common to all the UEs (or at least a group of UEs). The UE-specific subband, on the other hand, can be beamformed to serve only a limited number of UEs. Thus, the UE-specific subband may carry only UE-specific control information. The present disclosure provides several ways for the UE to obtain the configuration/bandwidth/allocation of the common control subband(s), from which it can derive more control information such as the system bandwidth, slot configuration, etc.

Accordingly, some aspects of the present disclosure provide for control and coordination of a set of subbands that carries certain narrowband control channels such as the PCFICH, PHICH, and PDCCH (e.g., which subband or subbands carry these narrowband control channels). As used in the present disclosure, subbands or subcarriers are discrete frequency units corresponding to an OFDM air interface.

In some examples, the set of one or more subbands that carries these narrowband control channels may be based on a suitable predetermined reference resource location (e.g., a location of a resource in an air interface) such as a set of one or more subbands. The actual bandwidth of these control channels (i.e., the number of subbands in the control channels, or the frequency range of the control channels) may be any suitable value, e.g., 5/10/20 MHz.

For example, the predetermined reference resource location, or reference subband(s), may be the subband(s) where the PSS, SSS, and PBCH are located. A device may be preconfigured with information about the set of subbands that carries these channels, and accordingly they may provide a consistent reference to determine the subband or subbands that carry the narrowband control channels.

Figure 9:
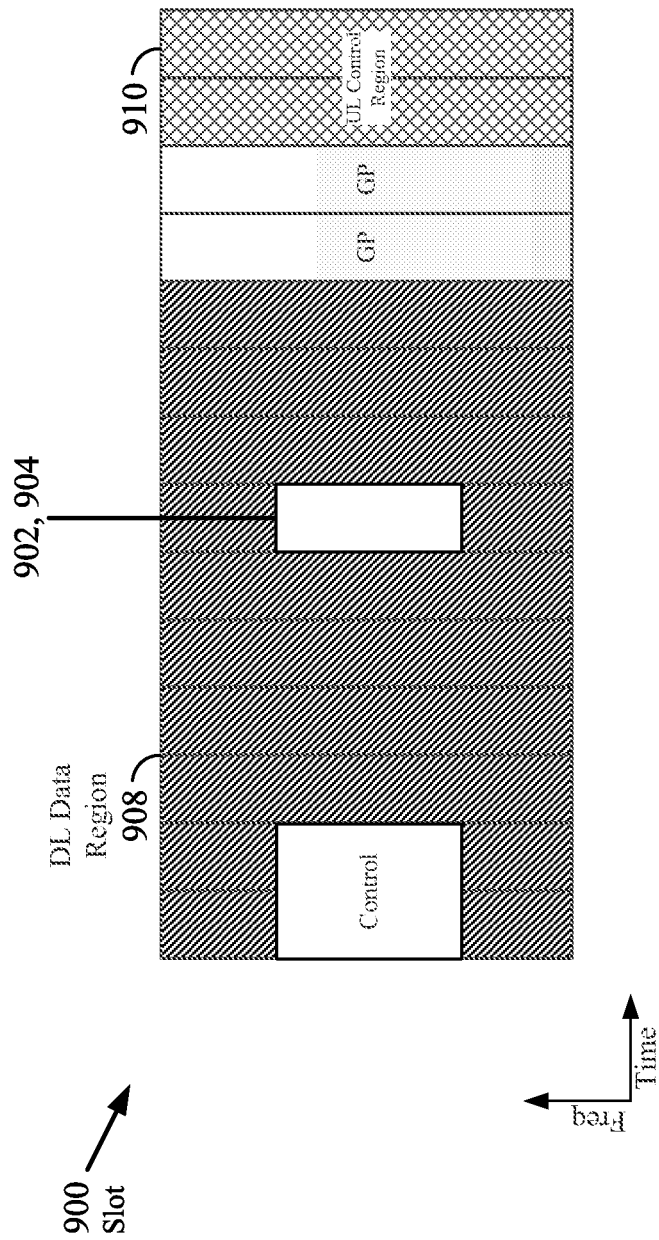
FIG. 9 is a schematic illustration of a slot in which narrowband control channels may occupy the same subband(s) as the set of subbands as the predetermined reference resource location.

In one example, narrowband control channels may occupy the same subband(s) as the set of subbands as the predetermined reference resource location (e.g., the set of subbands that carries the PSS, SSS, and PBCH). In this example, there is no need to indicate the allocation for the common control subband, since the allocation is already fixed to be the same as that of the PSS, SSS, and PBCH signals. However, because this example would force all of these channels to share the same set of subbands, resources within that set of subbands may become crowded. FIG. 9 is a schematic illustration of a slot 900 in which narrowband control channels 902 may occupy the same subband(s) as the set of subbands as the predetermined reference resource location 904. In the illustration of FIG. 9, all narrowband control channels occupy the same subbands as the predetermined reference resource location 904, although some occupy different lengths of time. FIG. 9 also illustrates, for exemplary purposes, a DL data region 908, a UL control region 910, and guard periods (GPs). The DL data region 908, UL control region 910, and guard periods (GPs) are exemplary and included for illustrative purposes to illustrate one aspect of a slot 900; other configurations of data regions (e.g., UL and/or DL data regions), control regions (e.g., UL and/or DL control regions), and GPs are acceptable.

In another example, narrowband control channels may occupy a set of subbands that a device may implicitly derive from the predetermined reference resource location (e.g., the set of subbands that carries the PSS, SSS, and PBCH), based on one or more parameters that would be available and known to both the transmitting device and the receiving device (e.g., the scheduling entity and the scheduled entity). In this example, the subband(s) that carry the narrowband control channels may correspond to a fixed frequency offset from the predetermined reference resource location (e.g., the set of subbands that carries the PSS/SSS/PBCH). For example, the subband(s) that carry the narrowband control channels may be located right next to or adjacent to the PSS/SSS/PBCH bandwidth.

Figure 10:
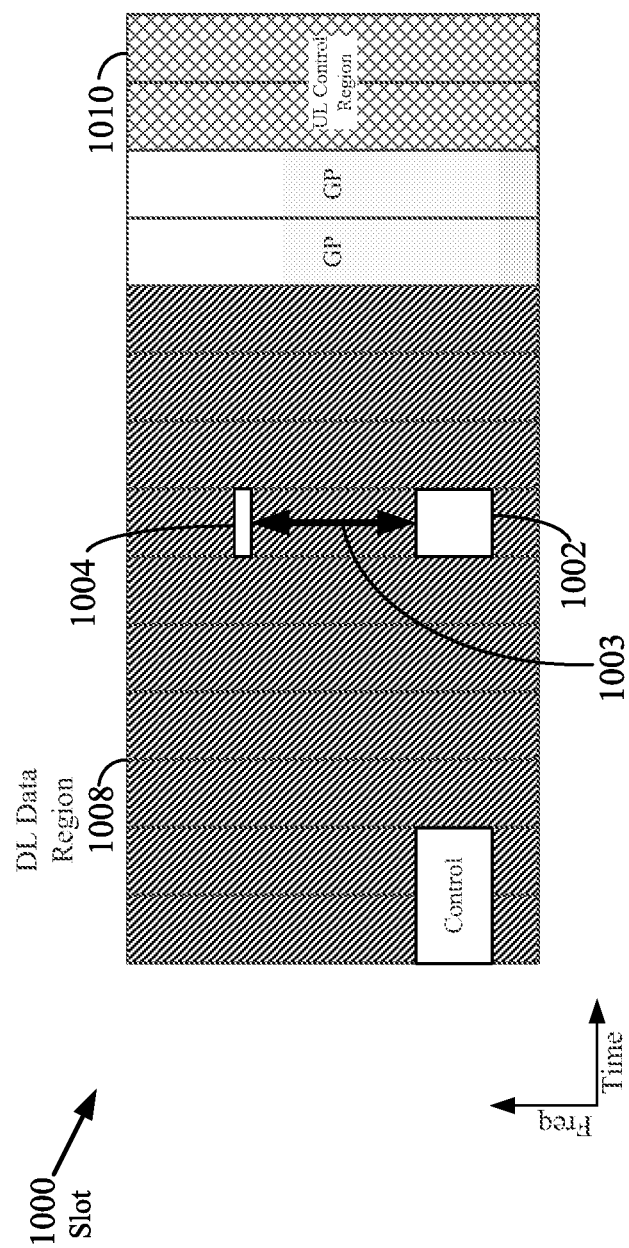
FIG. 10 is a schematic illustration of a slot in which the subband(s) that carry the narrowband control channels may correspond to a fixed frequency offset from the predetermined reference resource location.

FIG. 10 is a schematic illustration of a slot 1000 in which the subband(s) that carry the narrowband control channels 1002 may correspond to a fixed frequency offset 1003 from the predetermined reference resource location 1004. In one example, a PBCH may indicate the location of one common control resource set for initial access. The subband being referred to herein may be mapped to a "common control resource set for initial access" mentioned in 3GPP specifications. The location of a common control resource set can be derived by indicating a fixed offset from a predetermined reference resource location. The fixed frequency offset 1003 may be above or below the predetermined reference resource location 1004; it is shown below the predetermined reference resource location 1004 in FIG. 10 for convenience. In FIG. 10, the fixed frequency offset 1003 is represented by an arrow whose length corresponds to the fixed frequency offset 1003. FIG. 10 also illustrates, for exemplary purposes, a DL data region 1008, a UL control region 1010, and guard periods (GPs). The DL data region 1008, UL control region 1010, and guard periods (GPs) are exemplary and included for illustrative purposes to illustrate one aspect of a slot 1000; other configurations of data regions (e.g., UL and/or DL data regions), control regions (e.g., UL and/or DL control regions), and GPs are acceptable.

Figure 11:
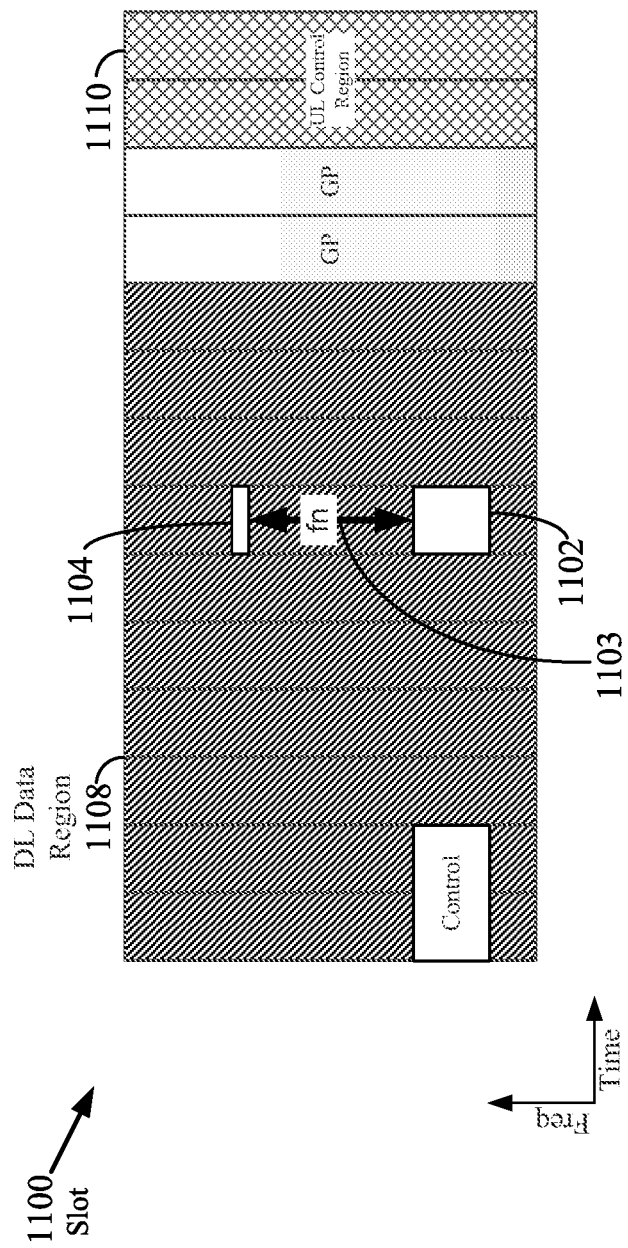
FIG. 11 is a schematic illustration of a slot in which the subband(s) that carry the narrowband control channels may be derived as a function of some cell-specific/zone-specific identity (such as a physical cell identifier or PCI) of the cell transmitting the PSS/SSS/PBCH.

In a further example, the subband(s) that carry the narrowband control channels may be derived as a function of a given parameter, such as some cell-specific/zone-specific identity (such as a physical cell identifier or PCI) of the cell or zone transmitting the PSS/SSS/PBCH. Any suitable mathematical relationship between a parameter such as the PCI and the narrowband control channel subband(s) may be utilized. One simple example is that the narrowband control channels may occupy either the subband(s) adjacent to and above the predetermined reference resource location, or the subband(s) adjacent to and below the predetermined reference resource location. In this example, the selection between the top or bottom subbands adjacent to the predetermined reference resource location may be made based on whether the PCI is even or odd. Those of ordinary skill in the art will comprehend that a PCI may be used in a similar fashion to split up the subband(s) that carry the narrowband control channels into any suitable number of groups, and is not limited to only two groups based on even or odd cell IDs. FIG. 11 is a schematic illustration of a slot 1100 in which the location of the subband(s) that carry the narrowband control channels 1102 may be derived as a function 1103 of some cell-specific/zone-specific identity (such as a physical cell identifier or PCI) of the cell transmitting the PSS/SSS/PBCH. The fixed function 1103 may result in the narrowband control channel 1102 being placed above or below the predetermined reference resource location 1004 in the frequency domain; it is shown below the predetermined reference resource location 1004 in FIG. 11 for convenience. In FIG. 11, the function 1003 is represented by an arrow bearing the letters "fn" for "function," whose length corresponds to the frequency offset calculated based on the function. FIG. 11 also illustrates, for exemplary purposes, a DL data region 1108, a UL control region 1110, and guard periods (GPs). The DL data region 1108, UL control region 1110, and guard periods (GPs) are exemplary and included for illustrative purposes to illustrate one aspect of a slot 1100; other configurations of data regions (e.g., UL and/or DL data regions), control regions (e.g., UL and/or DL control regions), and GPs are acceptable.

Of course, these examples given above may be combined in any suitable fashion. Further, the offset to use may be derived from any parameter that would be available to the transmitting and receiving devices, so that the location of these channels can be known to both nodes.

In still another example, narrowband control channels may occupy a set of subbands having a relationship to the predetermined reference resource location that is explicitly indicated in the PBCH. For example, the PBCH may carry two (2) bits that indicate whether the narrowband control channels occupy the same set of subbands as the predetermined reference resource location, subband(s) right next to but at the top of the predetermined reference resource location, subband(s) right next to but at the bottom of the predetermined reference resource location, etc. Those of ordinary skill in the art will comprehend that this example is illustrative in nature, and any suitable explicit indicator of a relationship to the predetermined reference resource location, having any suitable bit length, may be carried on the PBCH. In a further example, the bandwidth of the narrowband control channels may be explicitly indicated in the PBCH.

Of course, the set of subbands that carries the PSS/SSS/PBCH is not the only possible predetermined reference resource location that may act as a control subband location anchor in the above examples. In another example, a direct current (DC) tone subband may act as the predetermined reference resource location to provide an anchor for the control subband. Here, the DC tone corresponds to the carrier frequency. More specifically, the DC tone is the tone or subband among the subbands that appears at 0 Hz after the carrier is downconverted to baseband. In an NR network, it is expected that the DC tone will be indicated in the PBCH.

In a heterogeneous network, if different cells have different locations for the narrowband control channels, this would make it possible to achieve inter-cell interference coordination. Thus, a cell-specific location of the set of subbands that carries the narrowband control channels (i.e., one that is based on a cell-specific predetermined reference resource location such as the set of subbands that carries the PSS/SSS/PBCH), can be particularly useful in such heterogeneous networks.

As discussed above with reference to FIG. 1, an NR access network may utilize UL-based mobility, where the designs of the PSS/SSS/PBCH are zone-specific, rather than cell-specific. In these UL-based mobility access networks, cell-specific information such as physical cell ID (PCI) may be conveyed via some other, separate channel. In this case, the set of subbands that carries the narrowband control channels can be zone-ID specific, although it may be preferable for these control channel locations to be cell-specific. For derivation of cell-specific control channel locations, the set of subbands that carries the narrowband control channels can be based on cell specific information such as the PCI, zone-specific information, or a combination of the cell-specific and zone-specific information. For example, if the PBCH is zone-specific, the indication of the set of subbands that carries the narrowband control channels in the PBCH can be further combined with the PCI to derive cell-specific control subband information for the cell.

Determining the System Bandwidth

As described above, in an LTE network, the PBCH carries a MIB that provides the overall DL transmission bandwidth (DL system bandwidth). According to an aspect of the present disclosure, however, an NR network may extend on the algorithm described above, for determining the subbands that carry control channels, to provide an algorithm for determining the system bandwidth for both UL and DL transmissions.

That is, by virtue of the algorithm described above for identifying the set of one or more subbands that carry narrowband control channels, a receiving device may be enabled to receive and decode the control information carried on the PDCCH. Here, the PDCCH may carry a variety of information, which may include: (i) the parameters of some physical random access channel (PRACH)-like channel that the device can utilize in a random access transmission to trigger a response including an event-triggered SIB transmission, if the SIB transmission is on-demand; or (ii) SIB allocation, if the SIB transmission is periodic. The PRACH parameters may generally include a transmission format, a power, etc., to utilize in a random access transmission on the PRACH. The SIB transmission received in response may include information that defines the system bandwidths for UL and for DL transmissions.

In the above algorithm, the device (e.g., UE) that requests the system bandwidth with the random access transmission may, at the time it makes that request, have no information about the full system bandwidth. However, the SIB transmissions responsive to its request (carried on the data channel PDSCH) may be located in some other frequency location or subband, outside of the subband(s) used for the PSS/SSS/PBCH and the narrowband control channels that device has used up to this point. Accordingly, in an aspect of the disclosure, the scheduling information that provides this information for SIB may be provided by the narrowband control channel (e.g., the PDCCH). Of course, this scheduling information identifying the subband for SIB, carried on the PDCCH, may be omitted in an example where the location of SIB within the PDSCH may be limited to the same subband(s) that carry the PDCCH.

Figure 12:
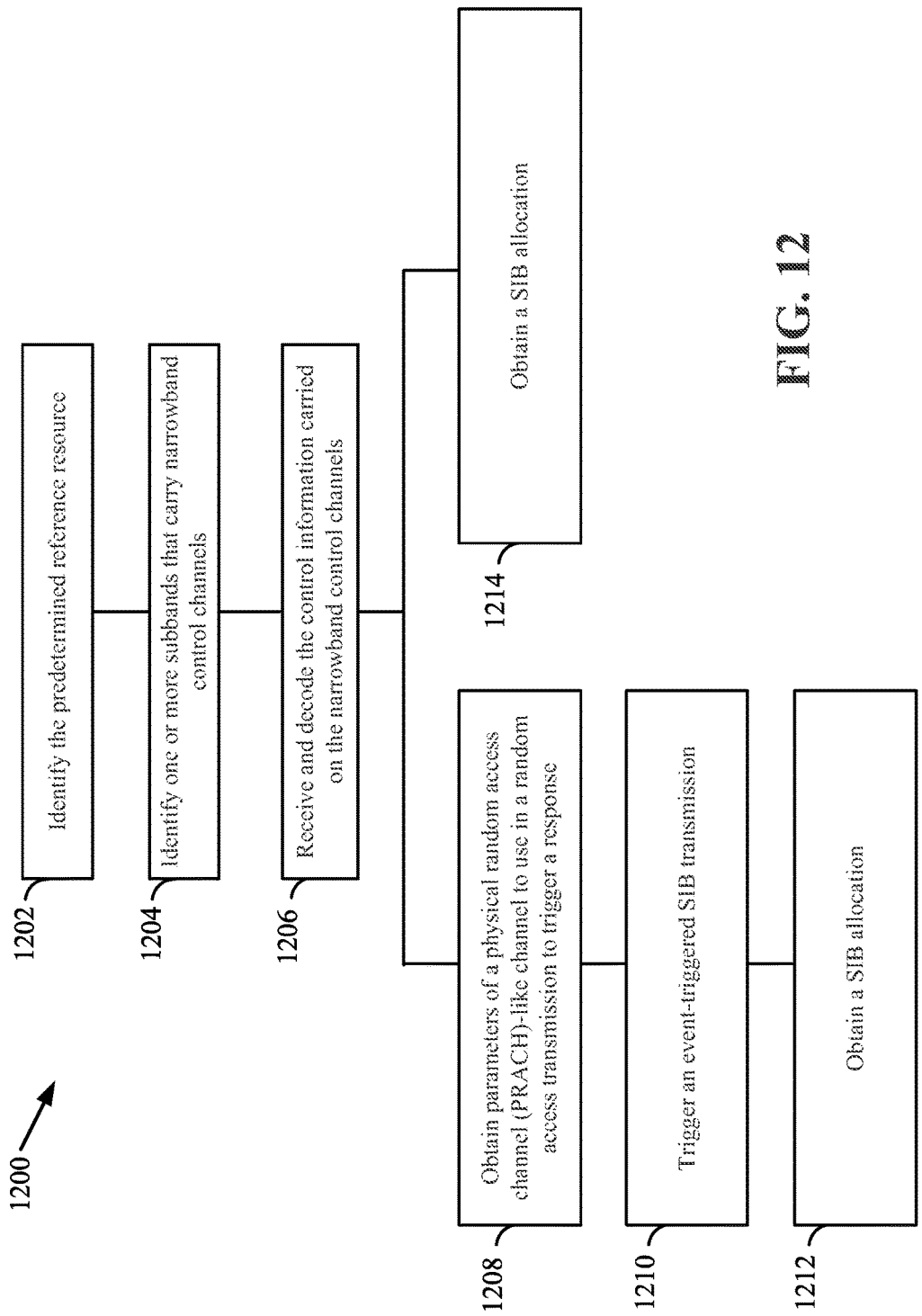
FIG. 12 illustrates a method through which a device (e.g., UE, scheduled entity) may obtain a system bandwidth.

FIG. 12 illustrates a method 1200 through which a device (e.g., UE, scheduled entity) may obtain a system bandwidth in accordance with some aspects of the present disclosure. As described below, some or all illustrated features may be omitted in a particular implementation within the scope of the present disclosure, and some illustrated features may not be required for implementation of all embodiments. In some examples, the method 1200 may be carried out by the scheduled entity 400 illustrated in FIG. 4. That is, the method 1200 may be operational at the scheduled entity 400 illustrated in FIG. 4. In some examples, the method 1200 may be carried out by any suitable apparatus or means for carrying out the functions or algorithm described below. At block 1202, the device may identify the reference resource. For example, as described above, the reference resource location may be a set of one or more subbands that carries one or more synchronization signals, such as the PSS and SSS. The reference resource location may additionally or alternatively be a set of one or more subbands that carries the PBCH. Accordingly, by locating these respective signals, the device may identify the reference resource. Of course, the location of the reference resource may correspond to any suitable signal in a given implementation. In another example, as described above, the reference resource location may be predetermined, and the predetermined reference resource location 407 may be stored in a device's memory. At block 1204, the device may identify one or more subbands that carry narrowband control channels, based on the predetermined reference resource location. The one or more subbands that carry the narrowband control channels may be offset from the predetermined reference resource location. In some examples, the offset may be zero. In some examples, the offset may be fixed or predetermined. In some examples, the offset may be calculated based on a predetermined function and parameters and factors as described above. In some aspects, there may be two offsets, one for downlink narrowband control channels and one for uplink narrowband control channels, as described below. Some aspects of the present disclosure provide for these narrowband control channels to be carried on different subbands over time, e.g., frequency hopping, as described below. A further aspect of the disclosure provides for a cell that may support two or more sets of control subbands, which may not necessarily be contiguous or adjacent to one another, as described below. In a multi-CC example and in the plural control subbands example, the use of a cross-control-subband or cross-CC indicator may be supported in order to support cross-subband or cross-CC scheduling, as described below. At block 1206, the device may receive and decode the control information carried on the narrowband control channels (e.g., receiving and decoding the PDCCH).

As described above, the control information carried on the narrowband control channels may include information to enable the device to determine the system bandwidth for UL and/or DL transmissions. In one aspect, where the SIB transmission is on-demand, at block 1208 the device may obtain, e.g., from within the control information on the narrowband control channels, parameters of some physical random access channel (PRACH)-like channel that the device can utilize in a random access transmission to trigger a response including an event-triggered SIB transmission. At block 1210, the device may utilize the PRACH-like channel to trigger an event-triggered SIB transmission using the obtained parameters. At block 1212, responsive to triggering the event-triggered SIB transmission, the device may obtain a SIB allocation. Accordingly, by reading the SIBs, the device may obtain the system bandwidth.

In another example, where the SIB transmission is periodic, at block 1214 the device can obtain a SIB allocation based on the control information carried on the narrowband control channels. By reading the SIBs, the device may obtain the system bandwidth.

DL Vs. UL Control Subbands

In addition to the determination of the subbands that carry DL control information, and the determination of the full system bandwidth for UL and DL communication, a further aspect of the disclosure provides for the determination of the subbands that carry UL control information. That is, in some examples, the subbands that carry UL control information may be separately indicated from the subbands that carry DL control information. The same algorithm, such as the one depicted in FIG. 12, used to obtain DL control information may be used to obtain the UL control information. It is noted that the algorithms described with respect to FIGS. 9-15 are applicable to both determinations of downlink and uplink narrowband control channels, and exemplify the determination of downlink narrowband control channels for convenience. As one example, the DL control subband may be indicated in the MIB, while the UL control subband may be indicated in SIB.

In another example, the UL control subband may be derived from, or based on the DL control subband. For example, for an FDD carrier, the UL and DL control subbands are always separated by the carrier spacing between DL and UL carriers. For a TDD carrier, the UL control subband may always be the same subband as the DL control subband.

In a given implementation, it is not necessary to be true that the UL control subband(s) have the same bandwidth as the DL control subband(s). That is, the UL control channels may have a different bandwidth than the DL control channels.

Frequency Hopping

In general, the size and location of the subband(s) that carry the DL and/or UL control information for a given cell may be predetermined. For example, these values may be repeatedly determined once the PSS/SSS/PBCH is determined and the cell ID is known. However, for improved inter-cell interference, it may be desired to impose a degree of randomization to the location of the subband(s) that carry the UL/DL control information. As shown in FIG. 11, the location of the subband(s) that carry the narrowband control channels 1102 may be derived as a function 1103. Accordingly, some aspects of the present disclosure provide for these narrowband control channels to be carried on different subbands over time, e.g., frequency hopping. For example, with reference to the algorithm described above that utilized a predetermined reference resource location to determine the set of subbands that carry control information, the offset relative to the predetermined reference resource location (e.g., denoted by the arrow denoting the function 1103 "fn" in FIG. 11) may be determined as a function of a system frame number (SFN) index. Here, the SFN is known from the information carried on the PBCH. In this way, the control subband(s) may repeatably and predictably hop from one frequency to another over time based on the different SFN values. It is noted that the algorithms described with respect to FIGS. 9-15 are applicable to both fixed, or predetermined, offsets in frequency from a predetermined reference resource location as well as frequency hopped offsets from the predetermined reference resource location.

Of course, this frequency-hopping algorithm is not limited only to use of the SFN index, but any suitable parameter that predictably varies over time may be utilized to determine the offset relative to the predetermined reference resource location to determine the set of subbands that carries the UUDL control information.

In a further example, the offset relative to the predetermined reference resource location may be determined as a joint function of a cell-specific or zone-specific information element (such as a PCI), and a time-varying parameter such as a SFN or a TTI index. This, and other functions, may be exemplified by the arrow denoting the function 1103 "fn" in FIG. 11.

In some examples, this subband frequency hopping may be enabled to result in offsets that result in the control information being carried on any subband within the entire system bandwidth. However, in other examples, a limited subset of the set of subbands of a carrier may be provided for frequency hopping.

In a further example, the frequency hopping as described above may not necessarily be limited to a single component carrier (CC) in a network that utilizes two or more CCs. That is, the frequency-hopping algorithm may enable the subband(s) that carry the control information to appear across different CCs over time. This multi-CC frequency hopping can be useful especially when a CC has a small system bandwidth. To enable such multi-CC frequency hopping, a receiving device or UE may initially monitor for the control subband(s) on a first CC, and later, the UE may monitor for the control subband(s) on a second CC.

Plurality of Control Subbands

A further aspect of the disclosure provides for a cell that may support two or more sets of control subbands, which may not necessarily be contiguous or adjacent to one another, and in some examples, may be beamformed differently from one another. Here, there may be a primary control subband and one or more secondary control subbands. The provision of a plurality of control subbands can be useful for controlling offloading within a cell, especially when the system bandwidth is large. It is noted that the algorithms described with respect to FIGS. 9-15 are applicable to the provision of a plurality of control subbands as described herein.

In some examples, the primary control subband may provide an indication of the location of the one or more secondary control subband(s).

In some examples, the different subbands may have different sizes or bandwidths than one another. For example, a primary control subband may have a 5 MHz bandwidth, while its corresponding secondary control subband may have a 1 MHz bandwidth. In this way, the secondary control subband may be used for UEs more optimized for battery power consumption.

In some examples, the secondary control subband(s) may have a limited set of scheduling functions. For example, a secondary control subband may only provide for UE-specific and/or group-specific scheduling needs, but might not provide broadcast or cell-specific scheduling/indications.

With multiple control subbands, a UE may determine only to monitor one control subband (or a subset of the control subbands) for better power consumption. Moreover, different UEs may monitor different subbands from one another.

Cross-Subband and Cross-CC Control

In the multi-component carrier (multi-CC) example and in the plural control subbands example, the use of a cross-control-subband or cross-CC indicator may be supported in order to support cross-subband or cross-CC scheduling. That is, the PDCCH may include a cross CC indicator that includes resource assignments, scheduling, or other control information corresponding to each of a plurality of CCs. Such a cross-control-subband or cross-CC indicator may provide naturally for UE-specific scheduling, as is performed in LTE networks. Here, UE-specific cross-subband or cross-CC scheduling can reduce crowding from too many UEs utilizing the same control subbands or same CCs. However, in a further aspect of the disclosure, the cross-control-subband or cross-CC indicator may additionally provide for group-specific or cell-specific scheduling. It is noted that the algorithms described with respect to FIGS. 9-15 are applicable to use with the cross-control-subband or cross-CC indicator.

Method of Wireless Communication

Figure 13:
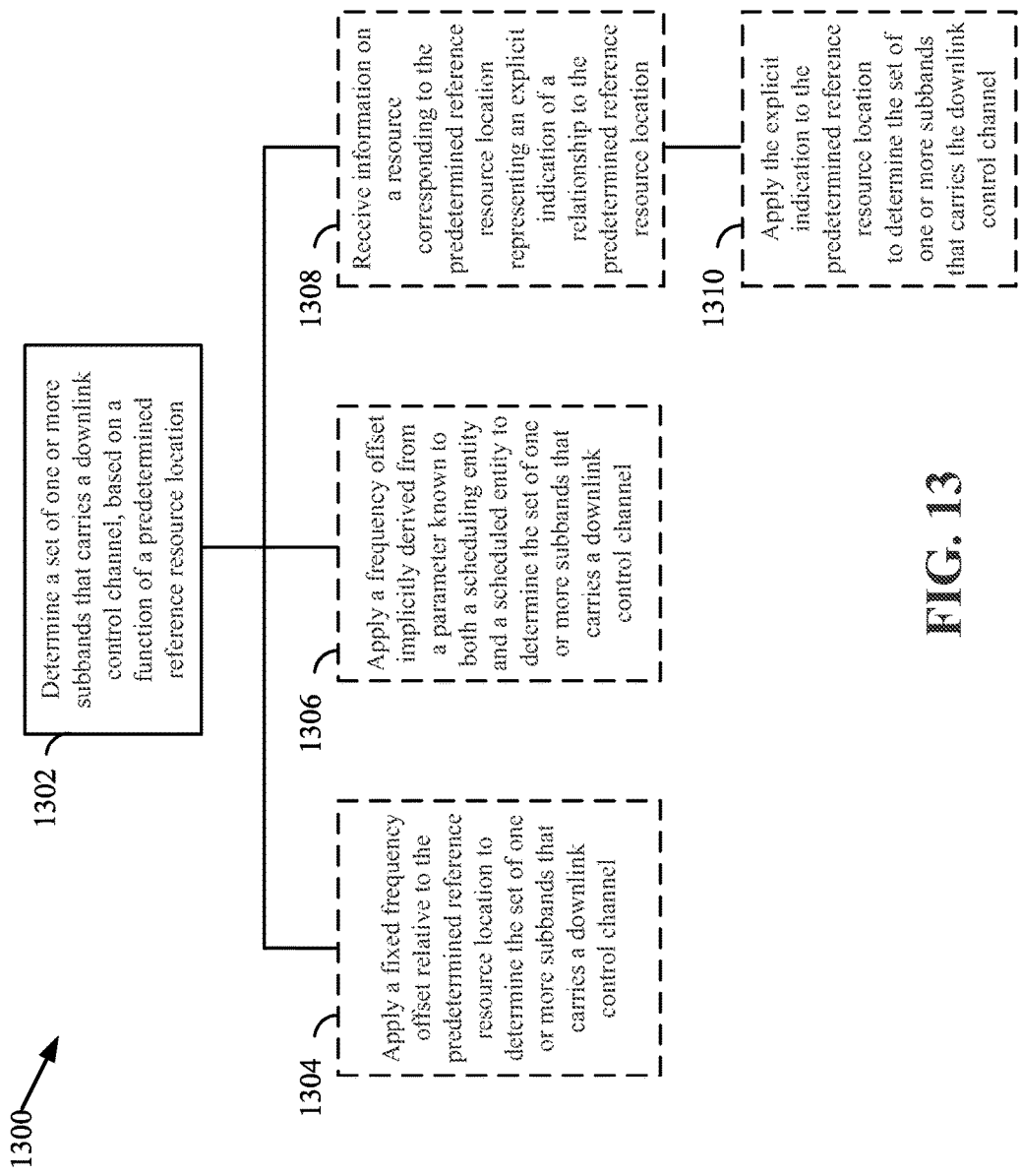
FIG. 13 is a flow diagram of a method of wireless communication between a scheduling entity and a scheduled entity over an air interface comprising a plurality of subbands according to some aspects of the present disclosure.

FIG. 13 is a flow diagram of a method 1300 of wireless communication between a scheduling entity and a scheduled entity over an air interface comprising a plurality of subbands according to some aspects of the present disclosure. As described below, some or all illustrated features may be omitted in a particular implementation within the scope of the present disclosure, and some illustrated features may not be required for implementation of all embodiments. In some examples, the method 1300 may be carried out by the scheduled entity 400 illustrated in FIG. 4. In some examples, the method 1300 may be carried out by any suitable apparatus or means for carrying out the functions or algorithm described below. In some examples, FIG. 13 may be considered an expansion of block 1204 of FIG. 12. For ease of description, FIG. 13 shows frequency offset for one downlink control channel. However, the described method may also be shown to apply to frequency offset for one uplink control channel. In another example, there may be two frequency offsets, one for downlink and one for uplink. For example, the narrowband control channels may be carried on different subbands over time, e.g., frequency hopping. For example, there could be more than one offset per downlink (as discussed above with regard to the plurality of control subbands), there could be cross-subband and cross-CC control subbands (as discussed above with regard to cross-subband and cross-CC control).

The method may include, at block 1302, determining a set of one or more subbands that carries a downlink control channel, based on a function of a predetermined reference resource location. In some aspects, the predetermined reference resource location includes a set of one or more subbands that carries synchronization signals and a broadcast channel. In some aspects, the synchronization signals may be exemplified by a primary synchronization signal and a secondary synchronization signal (PSS/SSS). In some aspects, the broadcast channel may be exemplified by a physical broadcast channel (PBCH). In some aspects, the predetermined reference resource location includes a set of one or more subbands that carries a direct current (DC) tone. In some aspects, the predetermined reference resource location is cell-specific, UE-specific, zone specific, or a combination thereof. In some aspects, the set of one or more subbands that carries a downlink control channel include the same set of subbands that carries the predetermined reference resource location.

In one example, the method may further include, at block 1304, optionally determining the set of one or more subbands that carries the downlink control channel by applying a fixed frequency offset relative to the predetermined reference resource location.

In one example, the method may further include, at block 1306, optionally determining the set of one or more subbands that carries the downlink control channel by applying a frequency offset implicitly derived from a parameter known to both the scheduling entity and the scheduled entity. Examples of the parameter include a cell-specific parameter. In one example, the cell-specific parameter may be a physical cell identifier (PCI). In another example, the parameter known to both the scheduling entity and the scheduled entity is a time-varying parameter, causing the set of one or more subbands that carries the downlink control channel to vary over time. In still another example, the parameter known to both the scheduling entity and the scheduled entity includes a time-varying parameter and at least one of a cell-specific parameter or a zone-specific parameter, the method further includes deriving the frequency offset by applying a joint function of the time-varying parameter and the cell-specific parameter or the zone-specific parameter. In some aspects, the time varying parameter is a system frame number (SFN). Here, the SFN is known from the information carried on the PBCH. In this way, the control subband(s) may repeatably and predictably hop from one frequency to another over time based on the different SFN values. Of course, this frequency-hopping algorithm is not limited only to use of the SFN index, but any suitable parameter that predictably varies over time may be utilized to determine the offset relative to the predetermined reference resource location to determine the set of subbands that carries the UUDL control information. In one example, when varying over time, the set of one or more subbands that carries the downlink control channel is limited to a subset of the subbands of a full downlink system bandwidth. In another example, when varying over time, the set of one or more subbands that carries the downlink control channel comprises at least one subband in each of a plurality of component carriers. In a further example, the offset relative to the predetermined reference resource location may be determined as a joint function of a cell-specific or zone-specific information element (such as a PCI), and a time-varying parameter such as a SFN or a TTI index. This, and other functions, may be exemplified by the arrow denoting the function 1103 "fn" in FIG. 11.

In one example, the method may include, at block 1308, optionally receiving information on a resource corresponding to the predetermined reference resource location representing an explicit indication of a relationship to the predetermined reference resource location. The method may further include, at block 1310, optionally applying the explicit indication to the predetermined reference resource location to determine the set of one or more subbands that carries the downlink control channel.

Figure 14:
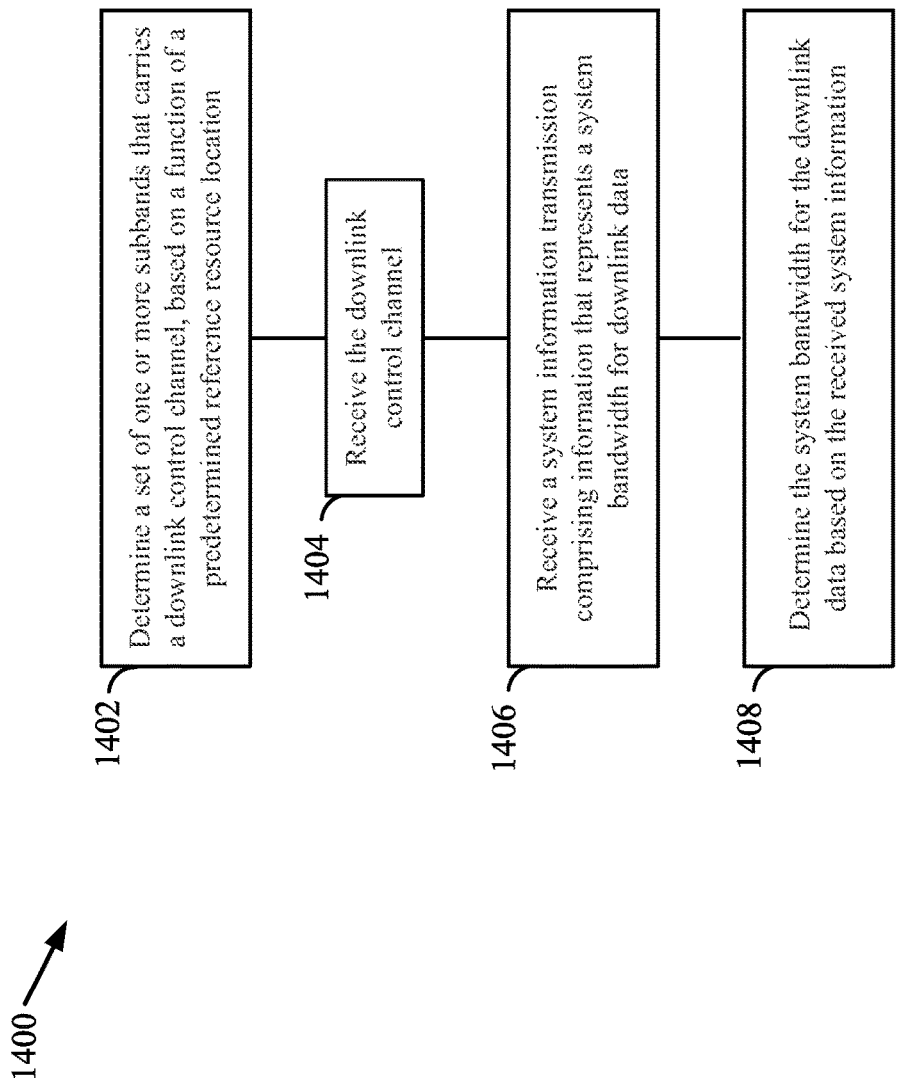
FIG. 14 is a another flow diagram of a method of wireless communication between a scheduling entity and a scheduled entity over an air interface comprising a plurality of subbands according to some aspects of the present disclosure.

FIG. 14 is another flow diagram of a method 1400 of wireless communication between a scheduling entity and a scheduled entity over an air interface comprising a plurality of subbands according to some aspects of the present disclosure. As described below, some or all illustrated features may be omitted in a particular implementation within the scope of the present disclosure, and some illustrated features may not be required for implementation of all embodiments. In some examples, the method 1400 may be carried out by the scheduled entity 400 illustrated in FIG. 4. In some examples, the method 1400 may be carried out by any suitable apparatus or means for carrying out the functions or algorithm described below. The method may include, at block 1402, determining a set of one or more subbands that carries a downlink control channel, based on a function of a predetermined reference resource location. In some aspects, the predetermined reference resource location includes a set of one or more subbands that carries synchronization signals and a broadcast channel. In some aspects, the synchronization signals may be exemplified by a primary synchronization signal and a secondary synchronization signal. In some aspects, the broadcast channel may be exemplified by a physical broadcast channel. In some aspects, the predetermined reference resource location includes a set of one or more subbands that carries a direct current (DC) tone. In some aspects, the predetermined reference resource location is cell-specific. In some aspects, the set of one or more subbands that carries a downlink control channel include the same set of subbands that carries the predetermined reference resource location.

By any of the various algorithms described herein, the scheduled entity may, at block 1404, receive the downlink control channel. The downlink control channel may inform the scheduled entity how to make a random access attempt, or where to find the system information blocks (SIB s) (i.e., system information transmissions). At block 1406, the scheduled entity may receive a system information transmission comprising information that represents a system bandwidth for downlink data. The method may further include, at block 1408, determining the system bandwidth for the downlink data based on the received system information. That is, based on the received system information, determine the system bandwidth for the downlink data. In one aspect, the method may include, receiving and decoding the downlink control channel to obtain a resource allocation corresponding to the system information transmission, wherein the receiving the system information transmission utilizes the resource allocation in the downlink control channel. In one aspect, the method may include receiving and decoding the downlink control channel to obtain one or more random access parameters; and transmitting a random access request based on the one or more random access parameters, wherein the receiving the system information transmission is in response to the random access request. In one aspect, the system information is received on a downlink data channel, and wherein the control channel further comprises scheduling information for the system information transmission. In another aspect, the system information is received on a downlink data channel, and wherein the system information is carried on the same one or more subbands that carries the downlink control channel. In one aspect, the system information further comprises information that represents a set of one or more subbands that carries an uplink control channel.

FIG. 15 is another flow diagram of a method 1500 of wireless communication between a scheduling entity and a scheduled entity over an air interface comprising a plurality of subbands according to some aspects of the present disclosure. As described below, some or all illustrated features may be omitted in a particular implementation within the scope of the present disclosure, and some illustrated features may not be required for implementation of all embodiments. In some examples, the method 1500 may be carried out by the scheduled entity 400 illustrated in FIG. 4. In some examples, the method 1500 may be carried out by any suitable apparatus or means for carrying out the functions or algorithm described below. The method may include, at block 1502, determining a set of one or more subbands that carries a downlink control channel, based on a function of a predetermined reference resource location. By any of the various algorithms described herein, the scheduled entity may, at block 1504, receive the downlink control channel. In one example, the method may include, at block 1506, determining a set of one or more subbands that carries an uplink control channel, based on a function of the set of one or more subbands that carries the downlink control channel. In some aspects, the set of one or more subbands that carry the uplink control channel are the same as the set of one or more subbands that carry the downlink control channel. In some aspects, the set of one or more subbands that carries the uplink control channel has a first bandwidth, and wherein the set of one or more subbands that carries the downlink control channel has a second bandwidth different from the first bandwidth.

In one example, the method may include, at block 1508, optionally determining a second set of one or more subbands that carries a second downlink control channel, based on a function of the set of one or more subbands that carries the downlink control channel. In some aspects, the downlink control channel comprises information that represents the second set of one or more subbands that carries the second downlink control channel. In some aspects, the set of one or more subbands that carries the downlink control channel has a first bandwidth, and the second set of one or more subbands that carries the second downlink control channel has a second bandwidth different from the first bandwidth. In some aspects, the set of one or more subbands that carries the downlink control channel is on a first component carrier, and the second set of one or more subbands that carries the second downlink control channel is on a second component carrier different from the first component carrier.

In some aspects, the downlink control channel comprises control information corresponding to each of a plurality of component carriers.

Several aspects of a wireless communication network have been presented with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication between a scheduling entity and a scheduled entity over an air interface comprising a plurality of subbands, the method operational at the scheduled entity, the method comprising:
   identifying a predetermined reference resource;
   determining a set of one or more subbands that carries a downlink control channel, based on a function of a location of the predetermined reference resource; and
   receiving the downlink control channel on the set of one or more subbands determined based on the function of the location of the predetermined reference resource.

2. The method of claim 1, wherein the predetermined reference resource location comprises a set of one or more subbands that carries one or more of a synchronization signal or a broadcast channel.

3. The method of claim 1, wherein the predetermined reference resource location comprises a set of one or more subbands that carries a direct current (DC) tone.

4. The method of claim 1, wherein the determining the set of one or more subbands that carries the downlink control channel comprises applying a fixed frequency offset relative to the predetermined reference resource location.

5. The method of claim 1, wherein the determining the set of one or more subbands that carries the downlink control channel comprises applying a frequency offset implicitly derived from a parameter known to both the scheduling entity and the scheduled entity.

6. The method of claim 5, wherein the parameter is a time-varying parameter, causing the set of one or more subbands that carries the downlink control channel to vary over time.

7. The method of claim 5, wherein the parameter comprises a time-varying parameter and at least one of a cell-specific parameter or a zone-specific parameter, the method further comprising:
   deriving the frequency offset by applying a joint function of the time-varying parameter and the cell-specific parameter or the zone-specific parameter.

8. The method of claim 7, wherein, when varying over time, the set of one or more subbands that carries the downlink control channel comprises at least one subband in each of a plurality of component carriers.

9. The method of claim 1, further comprising receiving information on a resource corresponding to the predetermined reference resource location representing an explicit indication of a relationship to the predetermined reference resource location,
   wherein the determining the set of one or more subbands that carries the downlink control channel comprises applying the explicit indication to the predetermined reference resource location.

10. The method of claim 1, further comprising:
receiving a system information transmission comprising information that represents a system bandwidth for downlink data; and
based on the received system information, determining the system bandwidth for the downlink data.

11. The method of claim 10, further comprising:
receiving and decoding the downlink control channel to obtain a resource allocation corresponding to the system information transmission,
wherein the receiving the system information transmission utilizes the resource allocation in the downlink control channel.

12. The method of claim 10, further comprising:
receiving and decoding the downlink control channel to obtain one or more random access parameters; and
transmitting a random access request based on the one or more random access parameters,
wherein the receiving the system information transmission is in response to the random access request.

13. The method of claim 1, wherein the downlink control channel comprises control information corresponding to each of a plurality of component carriers.

14. An apparatus for wireless communication, comprising:
a processor;
a transceiver communicatively coupled to the processor; and
a memory communicatively coupled to the processor,
wherein the processor is configured to:
identify a predetermined reference resource;
determine a set of one or more subbands that carries a downlink control channel, based on a function of a location of the predetermined reference resource; and
receive the downlink control channel on the set of one or more subbands determined based on the function of the location of the predetermined reference resource.

15. The apparatus of claim 14, wherein the predetermined reference resource location comprises a set of one or more subbands that carries synchronization signals and a broadcast channel.

16. The apparatus of claim 14, wherein the predetermined reference resource location comprises a set of one or more subbands that carries a direct current (DC) tone.

17. The apparatus of claim 14, wherein the determine the set of one or more subbands that carries the downlink control channel comprises the processor to be further configured to apply a fixed frequency offset relative to the predetermined reference resource location.

18. The apparatus of claim 14, wherein the determine the set of one or more subbands that carries the downlink control channel comprises the processor to be further configured to apply a frequency offset implicitly derived from a parameter known to both a scheduling entity and a scheduled entity.

19. The apparatus of claim 18, wherein the parameter is a time-varying parameter, causing the set of one or more subbands that carries the downlink control channel to vary over time.

20. The apparatus of claim 18, wherein the parameter comprises a time-varying parameter and at least one of a cell-specific parameter or a zone-specific parameter, the processor further configured to:

derive the frequency offset by applying a joint function of the time-varying parameter and the cell-specific parameter or the zone-specific parameter.

21. The apparatus of claim 14, wherein the processor is further configured to receive information on a resource corresponding to the predetermined reference resource location representing an explicit indication of a relationship to the predetermined reference resource location,
wherein the determine the set of one or more subbands that carries the downlink control channel comprises the processor being further configured to apply the explicit indication to the predetermined reference resource location.

22. The apparatus of claim 14, wherein the processor is further configured to:
receive a system information transmission comprising information that represents a system bandwidth for downlink data; and
based on the received system information, determine the system bandwidth for the downlink data.

23. The apparatus of claim 22, wherein the processor is further configured to:
receive and decode the downlink control channel to obtain a resource allocation corresponding to the system information transmission,
wherein the receive the system information transmission utilizes the resource allocation in the downlink control channel.

24. The apparatus of claim 22, wherein the processor is further configured to:
receive and decode the downlink control channel to obtain one or more random access parameters; and
transmit a random access request based on the one or more random access parameters,
wherein the receive the system information transmission is in response to the random access request.

25. The apparatus of claim 14, wherein the downlink control channel comprises control information corresponding to each of a plurality of component carriers.

26. A non-transitory computer-readable medium storing computer-executable code, comprising code for causing a computer to:
identify a predetermined reference resource;
determine a set of one or more subbands that carries a downlink control channel, based on a function of a location of the predetermined reference resource; and
receive the downlink control channel on the set of one or more subbands determined based on the function of the location of the predetermined reference resource.

27. The computer-readable medium of claim 26, wherein the code for causing the computer to determine the set of one or more subbands that carries the downlink control channel comprises code for causing the computer to apply a fixed frequency offset relative to the predetermined reference resource location.

28. The computer-readable medium of claim 26, wherein the code for causing the computer to determine the set of one or more subbands that carries the downlink control channel comprises code for causing the computer to apply a frequency offset implicitly derived from a parameter known to both a scheduling entity and a scheduled entity.

29. The computer-readable medium of claim 26, further comprising code for causing the computer to receive information on a resource corresponding to the predetermined reference resource location representing an explicit indication of a relationship to the predetermined reference resource location, wherein the code for causing the computer to determine the set of one or more subbands that carries the downlink control channel further comprises code for causing the computer to apply the explicit indication to the predetermined reference resource location.

30. The computer-readable medium of claim 26, further comprising code for causing the computer to receive a system information transmission comprising information that represents a system bandwidth for downlink data; and
based on the received system information, determine the system bandwidth for the downlink data.

\* \* \* \* \*